(12) United States Patent
Miyashita

(10) Patent No.: US 6,259,723 B1
(45) Date of Patent: Jul. 10, 2001

(54) DATA COMMUNICATION SYSTEM

(75) Inventor: Takumi Miyashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/037,889

(22) Filed: Mar. 10, 1998

(30) Foreign Application Priority Data

May 20, 1997 (JP) .................................................. 9-130052

(51) Int. Cl.$^7$ .................................................. H04B 1/707
(52) U.S. Cl. ............................................ 375/141; 375/145
(58) Field of Search ..................................... 370/320, 332;
455/442; 375/205, 140, 141, 144, 145,
146, 148, 149, 367

(56) References Cited

U.S. PATENT DOCUMENTS

| | | | |
|---|---|---|---|
| 4,644,523 | * | 2/1987 | Horwitz ................. 370/479 |
| 4,901,307 | * | 2/1990 | Gilhousen et al. .......... 370/320 |
| 5,101,501 | * | 3/1992 | Gilhousen et al. .......... 455/442 |
| 5,109,390 | * | 4/1992 | Gilhousen et al. .......... 375/206 |
| 5,222,075 | * | 6/1993 | Richley ................ 375/206 |
| 5,313,489 | * | 5/1994 | Menich et al. ........... 370/332 |
| 5,481,561 | * | 1/1996 | Fang .................... 370/320 |
| 5,485,486 | * | 1/1996 | Gilhousen et al. .......... 370/335 |
| 5,491,717 | * | 2/1996 | Hall .................... 370/332 |
| 5,793,794 | * | 8/1998 | Kato et al. .............. 375/200 |

* cited by examiner

Primary Examiner—Don N. Vo
(74) Attorney, Agent, or Firm—Staas & Halsey LLP

(57) ABSTRACT

A data communication system for executing data transmission and reception by modulating data using a code according to a CDMA system, in the field of optical communication, includes a code modulator for generating a first modulation code such as a spreading code on the basis of a transmission clock which has a transmission speed higher than a bit rate of a bit clock of data, and multiplying each bit of the data by the first modulation code so as to generate a code-modulated signal. The data communication system further includes a clock extractor for extracting a reception clock, which has a transmission speed corresponding to the bit rate of the bit clock, from the received code-modulated signal. The data communication system further includes a code demodulator for generating a second modulation code equivalent to the first modulation code on the basis of the reception clock, and multiplying the code-modulated signal by the second modulation code so as to restore the data, and a reception data synchronizer for outputting reception data that is synchronized with the restored data and second modulation code.

80 Claims, 17 Drawing Sheets

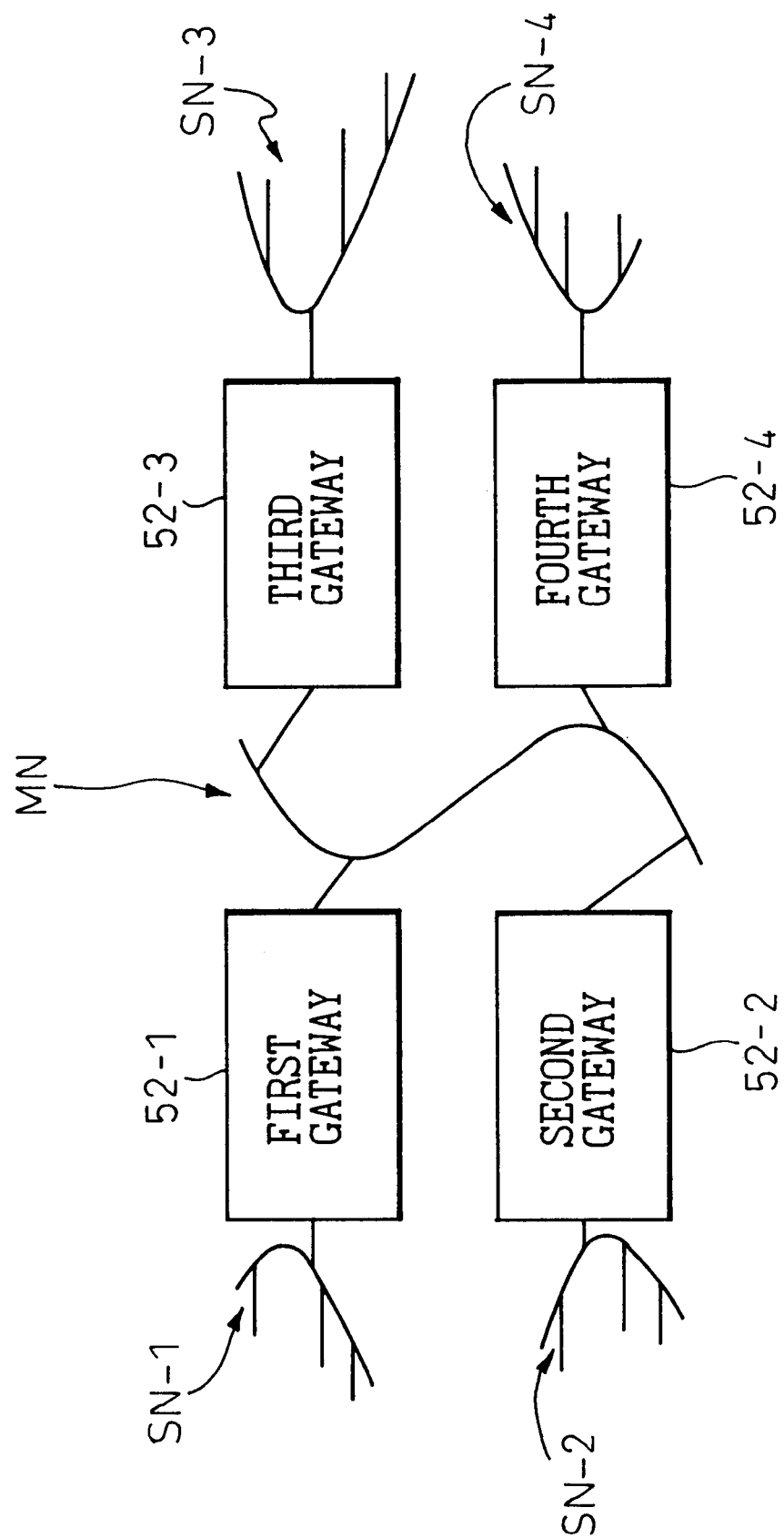

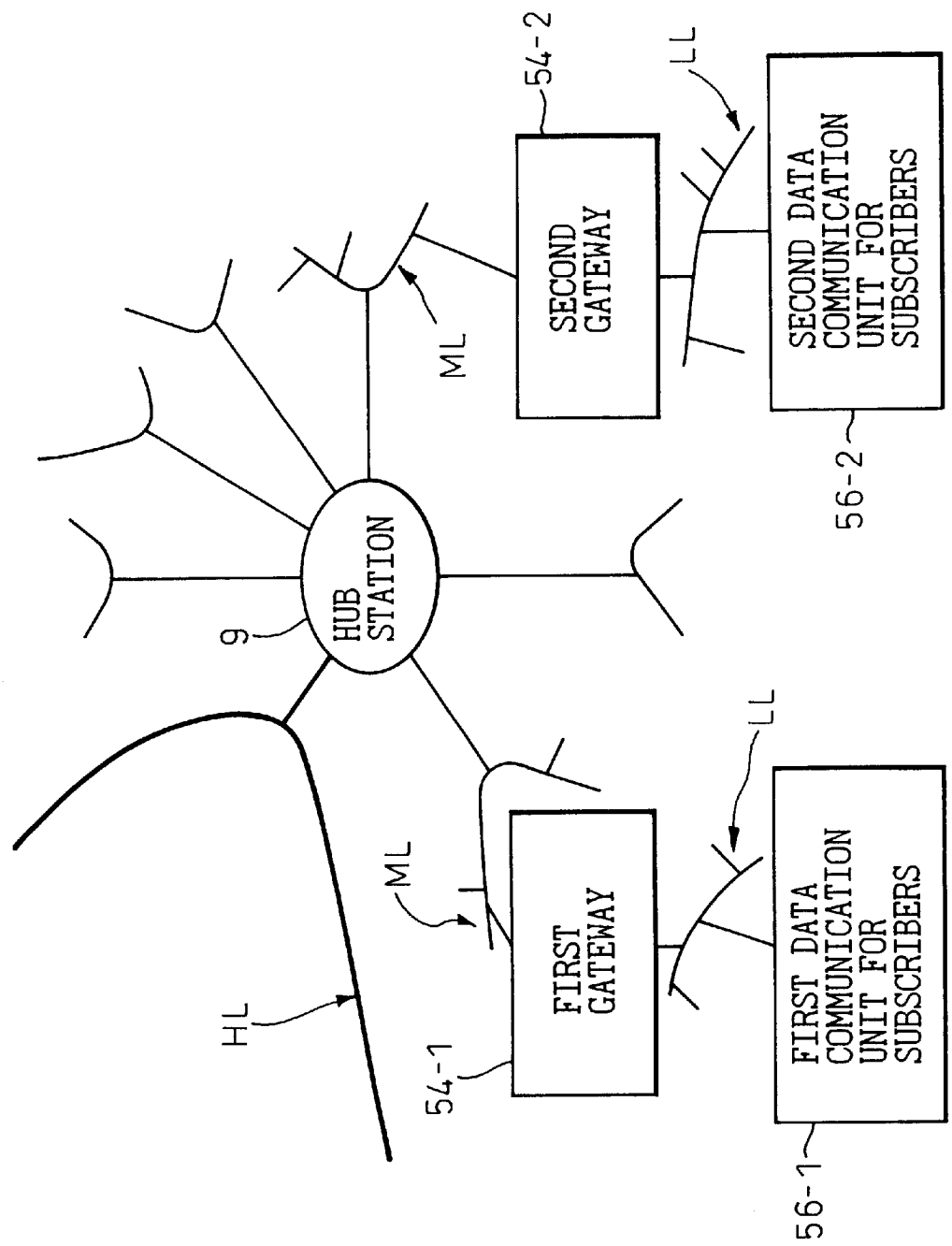

DATA COMMUNICATION SYSTEM

BACKGROUND OF THE INVENTION

1. Field of the Invention

The present invention relates to a data communication system for executing transmission and reception of digital data by modulating digital data for each bit thereof, by using a code modulation according to a CDMA (abbreviation for code division multiple access) technique in the field of optical communication utilizing light or the like.

A communication system in which a signal produced by multiplying a data stream of a digital form, which is an object of transmission, by a spreading code having a sufficiently long cycle, such as a pseudo-random signal for every bit, is used to modulate an intermediate-frequency signal (IF signal) or a carrier signal, has been widely adopted as a spread spectrum direct sequence based on the CDMA in the field of radio communication or the like. According to the spread spectrum direct sequence, a transmitting side uses the spreading code to modulate original transmission data according to PSK (abbreviation for phase shift keying) or the like, transmits the transmission data in the form of a radio wave. A receiving side demodulates data according to the PSK so as to synchronize and correlate the data with the spreading code used to transmit each signal (each bit) representing the transmission data, and thus reproduces the original transmission data.

The present invention utilizes the fact that optical communication using light enables much freer setting of the bandwidth occupied by data than radio communication does. Further, the present invention refers to measures which are to be taken to cope with various problems underlying multimedia or on-demand communication and multi-protocol communication by diversely applying the same code spread technique as the technique based on CDMA.

2. Description of the Related Art

For better understanding of the problems underlying a known data communication system utilizing light, an example of the configuration of the known data communication system will be described with reference to FIG. 1.

FIG. 1 is a block diagram schematically showing the configuration of a known data communication system utilizing light. As an example of the known data communication system for transmitting data by performing optical communication over optical fibers, a telephone exchange system, configured in such a manner that links of various hierarchical levels realized with a plurality of optical fibers (for example, low-speed links, middle-speed links, and high-speed links) branch out from a digital switching center, is shown.

In the telephone exchange system shown in FIG. 1, one digital switching center 90 for controlling all communication apparatuses connected on the links of a plurality of hierarchical levels on a centralized basis, is installed in the center of the telephone exchange system. A plurality of middle-speed links ML and high-speed links HL over which serial data is transmitted at a relatively high speed are linked to the digital switching center 90 in such a manner that they branch out from the digital switching center 90. Furthermore, a plurality of links of another hierarchical level, for example, low-speed links LL branch out from each of the middle-speed links ML and high-speed links HL. A plurality of communication apparatuses for subscribers (for example, first and second communication apparatuses for subscribers 92-1 and 92-2) each including a communication equipment such as an individual subscriber's telephone set is connected to each low-speed link LL.

In the telephone exchange system having the foregoing components, generally, the length of a bit stream of serial data to be transmitted over a link of a certain hierarchical level is different from the length of a bit stream of serial data to be transmitted over a link of another hierarchical level. For transferring data from the link of a certain hierarchical level (for example, a middle-speed link ML) to the link of another hierarchical level (for example, a low-speed link LL), it is necessary to exchange data in units of a bit stream, that is, a packet, at each branch point located between the link of a certain hierarchical level and the link of another hierarchical level. For example, in a telephone exchange system shown in FIG. 17, an ATM (abbreviation for asynchronous transfer mode) exchange composed of a plurality of ATM switches including first and second ATM switches 91-1 and 91-2 for adjusting the length of a packet containing data so that the packet can be transferred between links of different hierarchical levels, is installed at each branch point.

As mentioned above, in a known data communication system utilizing light, for example, the telephone exchange system configured in such a manner that links of various hierarchical levels ranging from high-speed links to low-speed links branch out, it is necessary to install an ATM exchange, which is composed of a plurality of switches for adjusting the length of a packet containing data so that the packet can be transferred between links of difference hierarchical levels, at each branch point between links of different hierarchical levels.

In the ATM exchange, since the length of a packet containing data is different depending on communication types, i.e., depending on whether a network (communication network) is composed of high-speed links for high-speed communication or composed of low-speed links for low-speed communication, it is necessary to carry out a complex management concerning data communication. More specifically, priorities concerning data transfer must be determined for each communication type, or steady-state real-time transmission must be guaranteed for data. This causes the problem that the circuitry including a plurality of switches used to achieve the above management or control procedures for controlling the switches becomes complex. Furthermore, after the length of a packet containing data is adjusted in the ATM exchange, even if a data communication speed changes, it is difficult to change the length of the packet containing data. There is therefore a difficulty in flexibly coping with communication requests issued from various kinds of communication equipment installed within the telephone exchange system.

In particular, when a place in which data should be received is a remote place, it is necessary to use many ATM exchanges each having complex circuitry for transmitting data to the remote place. The known telephone exchange system has therefore the problem that an area occupied by the ATM exchanges is relatively large.

On the other hand, from the viewpoint of guaranteeing real-time transmission, a storage device that operates at high speed must be installed for temporarily holding transmission data in an ATM exchange so as to prevent collisions of packets. This makes the circuitry of the ATM exchange more complex. Furthermore, some packet is awaited many times by numerous ATM exchanges until data contained in the packet reaches the remote place. From this viewpoint, there is a difficulty in avoiding a data delay having an uncertain period of time.

SUMMARY OF THE INVENTION

The present invention attempts to solve the foregoing problems. An object of the present invention is to provide a data communication system having simpler circuitry than known circuitry and capable of adjusting the length of a packet containing data depending on communication types or depending on whether a network is designed for high-speed communication or for low-speed communication, and capable of flexibly coping with requests for changing a communication speed issued from various kinds of communication equipment by changing the length of a packet containing data.

For accomplishing the above object, a data communication system in accordance with the present invention comprises a code modulating means for generating a first modulation code on the basis of a transmission clock which has a transmission speed equal to or higher than a bit rate of a bit clock of data that is an object of transmission, and multiplying the data for each bit thereof by the first modulation code so as to generate a code-modulated signal; a clock extracting unit for receiving the code-modulated signal sent from A the code modulating means, and extracting a reception clock, which has a transmission speed corresponding to the bit rate of the bit clock, from the thus received code-modulated signal; and a code demodulating means for generating a second modulation code equivalent to the first modulation code on the basis of the reception clock extracted by the clock extracting unit, and multiplying the received code-modulated signal by the second modulation code so as to restore the data.

Preferably, in the data communication system in accordance with the present invention, the code modulating means includes a first spreading code generating unit for generating a first spreading code which has a frequency band thereof spread, as the first modulation code on the basis of the transmission clock, and a first multiplying unit for multiplying each bit of the data by the first spreading code so as to spread a frequency spectrum of data.

More preferably, in the data communication system in accordance with the present invention, the code demodulating means includes a second spreading code generating unit for generating a second spreading code equivalent to the first spreading code, as the second modulation code on the basis of the reception clock extracted by the clock extracting unit, and a second multiplying unit for multiplying the received code-modulated signal by the second spreading code so as to restore the data.

More preferably, the data communication system in accordance with the present invention additionally includes a reception data synchronizing unit for synchronizing the data restored by the code demodulating means with the second modulation code, and outputting reception data that is synchronized with the data on the basis of code.

Furthermore, according to the first aspect of the present invention, a data communication system in accordance with the present invention comprises a transmission pseudo-random pulse generator for generating a cyclic code for transmission, which has a frequency band thereof spread and is composed of pseudo-random pulses, on the basis of a transmission clock having a transmission speed that is an integral multiple of a bit rate of a bit clock of data that is an object of transmission; a transmission multiplier for multiplying each bit of the data by the cyclic code for transmission so as to generate a code-modulated signal; a reception clock extracting circuit portion for extracting a reception clock, which has a transmission speed corresponding to the bit rate of the bit clock, from the received code-modulated signal; a reception pseudo-random pulse generator for generating a cyclic code for reception, which is equivalent to the cyclic code for transmission and composed of pseudo-random pulses, on the basis of the reception clock extracted by the reception clock extracting circuit portion; a reception multiplier for multiplying the received code-modulated signal by the cyclic code for reception so as to restore the data; and a reception data synchronizing circuit portion for synchronizing the restored data with the cyclic code for reception and outputting reception data that is synchronized with the data on the basis of code.

Furthermore, according to the second aspect of the present invention, a data communication system in accordance with the present invention comprises a transmission pseudo-random pulse generator for generating a transmission cyclic code, which has a frequency band thereof spread and is composed of pseudo-random pulses, on the basis of a transmission clock having a transmission speed equal to or higher than a bit rate of a bit clock of data that is an object of transmission; a transmission multiplier for multiplying each bit of the data by the cyclic code for transmission so as to generate a code-modulated signal; a reception clock extracting circuit portion for receiving the code-modulated signal and extracting a reception clock, which has a transmission speed corresponding to the bit rate of the bit clock, from the received code-modulated signal; a reception pseudo-random pulse generator for generating a cyclic code for reception, which is equivalent to the cyclic code for transmission and composed of pseudo-random pulses, on the basis of the reception clock extracted by the reception clock extracting circuit portion; a reception multiplier for multiplying the received code-modulated signal by the cyclic code for reception so as to restore the data, and a reception data synchronizing circuit portion for synchronizing the restored data with the cyclic code for reception and outputting reception data that is synchronized with the data on the basis of code.

Furthermore, according to the third aspect of the present invention, a data communication system in accordance with the present invention comprises a transmission pseudo-random pulse generator for generating a cyclic code for transmission, which has a frequency band thereof spread and is composed of pseudo-random pulses, on the basis of a transmission clock having a transmission speed equal to or higher than a bit rate of a bit clock of data that is an object of transmission; a transmission multiplier for multiplying the data by the cyclic code for transmission in units of a plurality of bits so as to generate a code-modulated signal; a reception clock extracting circuit portion for receiving the code-modulated signal and extracting a reception clock, which has a transmission speed corresponding to the bit rate of the bit clock, from the received code-modulated signal; a reception pseudo-random pulse generator for generating a cyclic code for reception, which is equivalent to the cyclic code for transmission and composed of pseudo-random pulses, on the basis of the reception clock extracted by the reception clock extracting circuit portion; a reception multiplier for multiplying the received code-modulated signal by the cyclic code for reception so as to restore the data; and a reception data synchronizing circuit portion for synchronizing the restored data with the cyclic code for reception and outputting reception data that is synchronized with the data on the basis of code.

Furthermore, according to the fourth aspect of the present invention, a data communication system in accordance with the present invention comprises a transmission code generator for generating a non-cyclic code for transmission, which has a frequency band thereof spread, on the basis of a transmission clock having a transmission speed that is an integral multiple of a bit rate of a bit clock of data that is an object of transmission; a transmission multiplier for multiplying each bit of the data by the non-cyclic code for transmission so as to generate a code-modulated signal; a reception clock extracting circuit portion for receiving the code-modulated signal and extracting a reception clock, which has a transmission speed corresponding to the bit rate, from the received code-modulated signal; a reception code generator for generating a non-cyclic code for reception, which is equivalent to the non-cyclic code for transmission, on the basis of the reception clock extracted by the reception clock extracting circuit portion; a reception multiplier for multiplying the received code-modulated signal by the non-cyclic code for reception so as to restore the data; and a reception data synchronizing circuit portion for synchronizing the restored data with the non-cyclic code for reception and outputting reception data that is synchronized with the data on the basis of code.

Moreover, according to a modification of the fourth aspect of the present invention, a data communication system in accordance with the present invention comprises a transmission code generator for generating a non-cyclic code for transmission, which has a frequency band thereof spread, on the basis of a transmission clock having a transmission speed equal to or higher than a bit rate of a bit clock of data that is an object of transmission; a transmission multiplier for multiplying the data by the non-cyclic code for transmission in units of a plurality of bits so as to generate a code-modulated signal; a reception clock extracting circuit portion for receiving the code-modulated signal and extracting a reception clock, which has a transmission speed corresponding to the bit rate of a bit clock, from the received code-modulated signal; a reception code generator for generating a non-cyclic code for reception, which is equivalent to the cyclic code for transmission, on the basis of the reception clock extracted by the reception clock extracting circuit portion; a reception multiplier for multiplying the received code-modulated signal by the non-cyclic code for reception so as to restore the data; and a reception data synchronizing circuit portion for synchronizing the restored data with the non-cyclic code for reception and outputting reception data that is synchronized with the data on the basis of code.

Furthermore, according to the fifth aspect of the present invention, a data communication system in accordance with the present invention comprises a plurality of kinds of transmission pseudo-random pulse generators for generating a plurality of cyclic codes for transmission, each of which has a frequency band thereof spread and is composed of pseudo-random pulses, on the basis of a plurality of transmission clocks respectively having transmission speeds that are integral multiples of bit rates of bit clocks of a plurality of kinds of data items that are objects of transmission; a plurality of kinds of transmission multipliers for multiplying the bits of the plurality of data items by the plurality of cyclic codes for transmission so as to generate a plurality of kinds of code-modulated signals; a reception clock extracting circuit portion for receiving the plurality of kinds of code-modulated signals and extracting reception clocks, which have transmission speeds corresponding to the bit rates, respectively, from the plurality of kinds of received code-modulated signals; a reception pseudo-random pulse generator for generating cyclic codes for reception, which are equivalent to the transmission cyclic codes and are each composed of pseudo-random pulses, on the basis of the reception clocks extracted by the reception clock extracting circuit portion; a reception multiplier for multiplying the plurality of kinds of received code-modulated signals by the cyclic codes for reception so as to restore the plurality of kinds of data items; and a reception data synchronizing circuit portion for synchronizing the plurality of kinds of restored data items with the cyclic codes for reception and outputting reception data items that are synchronized with the plurality of kinds of data items on the basis of codes.

In the data communication system according to the fifth aspect, even though the plurality of kinds of bit clocks whose pulse rates determine the plurality of kinds of the bit rates, and the plurality of kinds of transmission clocks are not synchronized with each other, the plurality of kinds of code-modulated signals can be multiplexed and transmitted.

Furthermore, according to the fifth aspect, the present invention can apply to a data communication system in which the transmission speeds at which the plurality of kinds of transmission clocks are transmitted are higher than bit rates of the bit clocks of data items that are objects of transmission, and the transmission speeds are not integral multiples of the bit rates.

Furthermore, according to the fifth aspect, the present invention can apply to a data communication system in which non-cyclic codes are substituted for the cyclic codes in order to modulate or demodulate a plurality of kinds of data items.

Furthermore, according to the sixth aspect of the present invention, a data communication system in accordance with the present invention comprises a plurality of kinds of transmission pseudo-random pulse generators for generating a plurality of cyclic codes for transmission, each of which has a frequency band thereof spread and is composed of pseudo-random pulses, on the basis of a plurality of kinds of transmission clocks respectively having transmission speeds that are integral multiples of a plurality of kinds of bit rates of bit clocks of a plurality of kinds of data items that are objects of transmission; a plurality of kinds of transmission multipliers for multiplying each bit of the plurality of kinds of data items by the plurality of kinds of cyclic codes for transmission so as to generate a plurality of kinds of code-modulated signals; a reception clock extracting circuit portion for receiving the plurality of kinds of code-modulated signals and extracting reception clocks, which have transmission speeds corresponding to the bit rates, respectively, from the plurality of kinds of received code-modulated signals; a reception pseudo-random pulse generator for generating cyclic codes for reception, which are equivalent to the plurality of kinds of transmission cyclic codes and are each composed of pseudo-random pulses; a reception multiplier for multiplying the plurality of kinds of received code-modulated signals by the cyclic codes for reception so as to restore the plurality of kinds of data items; and a reception data synchronizing circuit portion for synchronizing the plurality of kinds of restored data items with the cyclic codes for reception and outputting reception data items that are synchronized with the plurality of kinds of data items according to the codes.

In the data communication system according to the sixth aspect, each clock in at least one of a plurality of kinds of clocks whose pulse rates determine the plurality of kinds of bit rates, and the plurality of kinds of transmission clocks is shifted by a given value relative to any other clock, in order to multiplex and transmit the plurality of kinds of code-modulated signals.

Moreover, according to the sixth aspect, the present invention can apply to a data communication system, in which transmission speeds at which a plurality of transmission clocks are transmitted are higher than bit rates of data items that are objects of transmission, and the transmission speeds are not integral multiples of the bit rates.

Moreover, according to the sixth aspect, the present invention can apply to a data communication system in which non-cyclic codes are substituted for the cyclic codes in order to modulate and demodulate a plurality of data items.

Furthermore, according to the seventh aspect of the present invention, a data communication system in accordance with the present invention is characterized in that a plurality of kinds of code-modulated signals are transmitted from transmission pseudo-random pulse generators and transmission multipliers (these components are represented by those according to the above sixth aspect), which belong to any one hierarchy of a network composed of a plurality of hierarchies, to a reception clock extracting circuit portions, reception pseudo-random pulse generator, and reception multiplier (these components are represented by those according to the above sixth aspect) which belong to another hierarchy of the network.

Moreover, according to the seventh aspect of the present invention, the data communication system in accordance with the present invention is characterized in that a plurality of kinds of code-modulated signals are transmitted from transmission code generators and transmission multipliers (these components are represented by those in accordance with the above sixth aspect), which belong to any one hierarchy of a network composed of a plurality of hierarchies, to a reception clock extracting circuit portion, reception code generator, and reception multiplier (these components are represented by those in accordance with the above sixth embodiment) which belong to another hierarchy of the network.

Furthermore, according to the eighth aspect of the present invention, a data communication system in accordance with the present invention comprises, at a plurality of branch points constituting a network, a plurality of kinds of transmission pseudo-random pulse generators for generating a plurality of kinds of cyclic codes for transmission, each of which has a frequency band thereof spread and is composed of pseudo-random pulses, on the basis of a plurality of kinds of transmission clocks respectively having transmission speeds that are integral multiples of a plurality of kinds of bit rates of bit clocks of a plurality of kinds of data items that are objects of transmission; a plurality of kinds of transmission multipliers for multiplying the bits of the plurality of kinds of data items by the plurality of kinds of cyclic codes for transmission so as to generate a plurality of kinds of code-modulated signals; a reception clock extracting circuit portion for receiving the plurality of kinds of code-modulated signals and extracting reception clocks, which have transmission speeds corresponding to the plurality of kinds of bit rates, respectively, from the plurality of kinds of received code-modulated signals; a reception pseudo-random pulse generator for generating cyclic codes for reception, which are equivalent to the plurality of kinds of cyclic codes for transmission and are each composed of pseudo-random pulses, on the basis of the reception clocks extracted by the reception clock extracting circuit portions; a reception multiplier for multiplying the plurality of kinds of received code-modulated signals by the cyclic codes for reception so as to restore the plurality of kinds of data items; and a reception data synchronizing circuit portion for synchronizing the plurality of kinds of restored data items with the cyclic codes for reception and outputting reception data items that are synchronized with the plurality of kinds of data items on the basis of codes.

In the data communication system according to the eighth aspect, the plurality of kinds of cyclic codes for transmission are assigned to the plurality of branch points, and the contents and phases of the cyclic codes associated with the branch points are differentiated in advance from each other.

Moreover, according to the eighth aspect of the present invention, the present invention can apply to a data communication system in which transmission speeds at which the plurality of kinds of transmission clocks are transmitted are higher than the bit rates of the data items that are objects of transmission, and the transmission speeds are not integral multiples of the bit rates.

Moreover, according to the eighth aspect of the present invention, the present invention can apply to a data communication system in which non-cyclic codes are substituted for the cyclic codes in order to modulate and demodulate a plurality of kinds of data items.

Furthermore, according to the ninth aspect of the present invention, a data communication system comprises, at a plurality of branch points constituting a network, a plurality of kinds of transmission pseudo-random pulse generators for generating a plurality of kinds of cyclic codes for transmission, each of which has a frequency band thereof spread and is composed of pseudo-random pulses, on the basis of a plurality of transmission clocks respectively having transmission speeds that are integral multiples of a plurality of kinds of bit rates of bit clocks of a plurality of kinds of data items that are objects of transmission; a plurality of kinds of transmission multipliers for multiplying the bits of the plurality of kinds of data items by the plurality of cyclic codes for transmission so as to generate a plurality of kinds of code-modulated signals; a reception clock extracting circuit portion for receiving the plurality of kinds of code-modulated signals and extracting reception clocks, which have transmission speeds corresponding to the bit rates, respectively, from the plurality of kinds of received code-modulated signals; a reception pseudo-random pulse generator for generating cyclic codes for reception, which are equivalent to the plurality of kinds of cyclic codes for transmission and are each composed of pseudo-random pulses, on the basis of the reception clocks extracted by the reception clock extracting circuit portions; a reception multiplier for multiplying the plurality of kinds of received code-modulated signals by the cyclic codes for reception so as to restore the plurality of kinds of data items; and a reception data synchronizing circuit portion for synchronizing the plurality of kinds of restored data items with the cyclic codes for reception and outputting reception data items that are synchronized with the plurality of kinds of data items on the basis of codes.

In the data communication system according to the ninth aspect, common cyclic codes that enable to pass through all or many of the plurality of branch points, are assigned.

Moreover, according to the ninth aspect, the present invention can apply to a data communication system in which transmission speeds at which the plurality of kinds of transmission clocks are transmitted are higher than bit rates of data items that are objects of transmission, and the transmission clocks are not integral multiples of the bit rates.

Moreover, according to the ninth aspect, the present invention can apply to a data communication system in which non-cyclic codes are substituted for the cyclic codes in order to modulate and demodulate a plurality of kinds of data items.

Furthermore, according to the tenth aspect of the present invention, a data communication system is connected to a plurality of branch points constituting a network, and comprises a plurality of data communication units for mutually transmitting and receiving a plurality of kinds of data items and one central control unit for controlling the plurality of data communication units.

The plurality of data communication units each comprise a plurality of kinds of transmission pseudo-random pulse generators for generating a plurality of kinds of cyclic codes for transmission, each of which has a frequency band thereof spread and is composed of pseudo-random pulses, on the basis of a plurality of kinds of transmission clocks respectively having transmission speeds that are integral multiples of a plurality of kinds of bit rates of bit clocks of a plurality of kinds of data items that are objects of transmission; a plurality of kinds of transmission multipliers for multiplying each bit of the plurality of kinds of data items by the plurality of kinds of cyclic codes for transmission so as to generate a plurality of kinds of code-modulated signals; a reception clock extracting circuit portion for receiving the plurality of kinds of code-modulated signals and extracting reception clocks, which have transmission speeds corresponding to the bit rates, respectively, from the plurality of kinds of received code-modulated signals; a reception pseudo-random pulse generator for generating cyclic codes for reception, which are equivalent to the plurality of kinds of cyclic codes for transmission and are each composed of pseudo-random pulses, on the basis of the reception clocks extracted by the reception clock extracting circuit portions; a reception multiplier for multiplying the plurality of kinds of received code-modulated signals by the cyclic codes for reception so as to restore the plurality of kinds of data items; and a reception data synchronizing circuit portion for synchronizing the plurality of kinds of restored data items with the cyclic codes for reception and outputting reception data items that are synchronized with the plurality of kinds of data items on the basis of codes.

In the plurality of data communication units, the plurality of kinds of cyclic codes for transmission are assigned to the plurality of branch points, and the contents and phases of the cyclic codes associated with the branch points are differentiated in advance from each other. An intended address is sent from the central control unit to the plurality of branch points, and a data communication unit connected to a branch point to which one of the cyclic codes indicating an address agreeing with the intended address, transmits and receives data.

Preferably, in the data communication system according to the tenth aspect of the present invention, the plurality of branch points are each provided with several candidates for the cyclic codes, and the data communication units select given cyclic codes.

More preferably, in the data communication system according to the tenth aspect of the present invention, a part or all of the plurality of kinds of cyclic codes for transmission are sent from the central control unit.

More preferably, in the data communication system according to the tenth aspect of the present invention, transmission lines linking the plurality of data communication units and the central control unit are formed with double lines.

More preferably, in the data communication system according to the tenth aspect of the present invention, all or a part of the transmission lines that are double lines are designed so that the plurality of kinds of data items can be transmitted bidirectionally.

More preferably, in the data communication system according to the tenth aspect of the present invention, when a plurality of kinds of data items are communicated according to a format in which data is transmitted at low speed, cyclic codes each having a long bit string are used. When a plurality of kinds of data items are communicated according to a format in which data is transmitted at high speed, cyclic codes each having a short bit string are used.

More preferably, in the data communication system according to the tenth aspect of the present invention, the minimum value of a Hamming distance between a cyclic code having a short bit string and a code which is a part of a cyclic code having a long bit string, of which a pattern of bits is inconsistent with that of the cyclic code having a short bit string, and of which the length is equal to that of the cyclic code having the short bit string, can be made large.

More preferably, in the data communication system according to the tenth aspect of the present invention, when cyclic codes assigned to the same hierarchical level of the network are arbitrated, the cyclic codes currently used by a data communication unit, or the identification numbers of the cyclic codes, are reported to all the other data communication units within the network.

More preferably, in the data communication system according to the tenth aspect of the present invention, when cyclic codes assigned to the same hierarchical level of the network are arbitrated, the cyclic codes currently used by a data communication unit, or the identification numbers of the cyclic codes, are reported to all the other data communication units within the network. Moreover, cyclic codes scheduled to be used later, or the identification numbers of the cyclic codes, are successively reported to all the other data communication units. When all the other data communication units acknowledge the cyclic codes, transmission of the plurality of kinds of data items is started.

More preferably, in the data communication system according to the tenth aspect of the present invention, when cyclic codes to be used by a data communication unit are determined, any other data communication unit using cyclic codes assigned to another hierarchical level is permitted to give an instruction or to select cyclic codes.

More preferably, in the data communication system according to the tenth aspect of the present invention, a plurality of kinds of transmission clocks are synchronized with each other in order to multiplex the plurality of kinds of code-modulated signals.

More preferably, in the data communication system according to the tenth aspect of the present invention, when the lengths of all cyclic codes are the same or the lengths of cyclic codes which are to be used are submultiples of a given value, a plurality of kinds of clocks whose pulse rates determine bit rates of a plurality of kinds of data items are mutually synchronized or are dephased in units of cycles of the transmission clocks.

More preferably, in the data communication system according to the tenth aspect of the present invention, even though the plurality of kinds of bit clocks whose pulse rates determine bit rates of a plurality of kinds of data items, and the plurality of kinds of transmission clocks are not synchronized with each other, the plurality of kinds of code-modulated signals can be multiplexed.

More preferably, according to the tenth aspect, the present invention can apply to a data communication system in which transmission rates at which a plurality of kinds of transmission clocks are higher than bit rates of data items that are objects of transmission and the transmission speed but are not integral multiples of the bit rates.

More preferably, according to the tenth aspect, the present invention can apply to a data communication system in which non-cyclic codes are substituted for the cyclic codes in order to modulate and demodulate a plurality of kinds of data items.

More preferably, according to the tenth embodiment of the present invention, a data communication system is connected to a plurality of branch points constituting a network and includes a plurality of data communication units for mutually transmitting and receiving a plurality of kinds of data items and one central control unit for controlling the plurality of data communication units.

The plurality of data communication units each comprise a plurality of kinds of transmission pseudo-random pulse generators for generating a plurality of kinds of cyclic codes for transmission, each of which has a frequency band thereof spread and is composed of pseudo-random pulses, on the basis of a plurality of kinds of transmission clocks respectively having transmission speeds that are integral multiples of a plurality of kinds of bit rates of a plurality of kinds of data items that are objects of transmission; a plurality of kinds of transmission multipliers for multiplying each bit of the plurality of kinds of data items by the plurality of kinds of cyclic codes for transmission so as to generate a plurality of kinds of code-modulated signals; a reception clock extracting circuit portion for receiving the plurality of kinds of code-modulated signals and extracting reception clocks, which have transmission speeds corresponding to the bit rates, respectively, from the plurality of kinds of received code-modulated signals; a reception pseudo-random pulse generator for generating cyclic codes for reception, which are equivalent to the plurality of kinds of cyclic codes for transmission and are each composed of pseudo-random pulses, on the basis of the reception clocks extracted by the reception clock extracting circuit portion; a reception multiplier for multiplying the plurality of kinds of received code-modulated signals by the cyclic codes for reception so as to restore the plurality of kinds of data items; and a reception data synchronizing circuit portion for synchronizing the plurality of kinds of restored data items with the cyclic codes for reception and outputting reception data items that are synchronized with the plurality of kinds of data items on the basis of code.

In the plurality of data communication units, common cyclic codes that enable to pass through all or many of the plurality of branch points, are assigned, and an intended address is sent from the central control unit to the plurality of branch points. A data communication unit connected to a branch point, to which one of the common cyclic codes indicating an address agreeing with the intended address is assigned, transmits and receives the data.

Furthermore, according to the tenth aspect, the present invention can apply to a data communication system, in which transmission rates at which a plurality of kinds of transmission clocks are transmitted are higher than bit rates of data items that are objects of transmission, and the transmission speeds are not integral multiples of the bit rates.

Furthermore, according to the tenth aspect, the present invention can apply to a data communication system in which non-cyclic codes are substituted for the cyclic codes in order to modulate and demodulate a plurality of kinds of data items.

Briefly, according to the present invention, the spread spectrum communication system based on the CDMA or the like and used for radio communication as well as a code modulation system are implemented in a data communication system. A modulation code (for example, a spreading code) and data (for example, a code-modulated signal) are correlated at a branch point between networks having different communication speeds or at a terminal of a network. This enables a network having a high communication speed (a network designed for high-speed communication) to branch out to a network having a low communication speed (a network designed for low-speed communication), or makes it possible to select data and fetch data into a terminal. Data which is to be transmitted from a certain terminal is multiplied by a modulation code in order to broaden the frequency band thereof. When data items sent from other terminals are present, the data to be transmitted is sent together with the data items sent from other terminals to a branch point at which the network having a high communication speed branches out. If necessary, the data items are multiplied by the modulation code in order to broaden the frequency bands thereof, and then sent to a network designed for high-speed communication. Owing to this technique, while various data items ranging from data which is to be communicated at high speed through data which is to be communicated at low speed can be communicated smoothly, the various data items can coexist within the data communication system.

To be more specific, in a data communication system according to the present invention, broadening a frequency band using a modulation code and multiplexing are carried out at at least a part of a network. This makes it possible to minimize the number of ATM exchanges to be installed along a communication channel along which data is transmitted, or to obviate the necessity of ATM exchanges.

In this case, an electrical communication network using coaxial cables or twisted pairs may be adopted for a network designed for low-speed communication, and an optical communication network using light may be adopted for a network for high-speed communication. An example of a hierarchical structure is such that a low-speed electrical communication network (network designed for low-speed communication) is constructed using twisted pairs within a certain room, a low-speed or middle-speed optical communication network based on a spreading code system (network designed for low-speed or middle-speed communication) is constructed in another room, a middle-speed communication network (network designed for middle-speed communication) is constructed using coaxial cables on the premises, a high-speed communication network (network designed for high-speed communication) is constructed outdoors using optical fibers, and a high-speed network (network designed for higher-speed communication) is constructed as a trunk network using high-speed optical fibers.

A network which has the foregoing hierarchical structure, and in which a communication network utilizing a modulation code such as a spreading code and a communication network utilizing ATM exchanges coexist, will be discussed below.

To begin with, when data items are multiplexed using a modulation code such as a spreading code only in a low-speed communication network near a terminal of the network, the multiplexed data items are, as a matter of convenience, transmitted synchronously with a transmission clock of a certain frequency. In this case, at a point in which the data is uploaded to a packet communication network having ATM exchanges and designed for high-speed communication, a packet having, like a conventional packet, a header specifying an address and management information should merely be created. On the other hand, at a point in which the data is downloaded from the packet communication network designed for high-speed communication to a communication network which is designed for low-speed communication and within which a modulation code is employed, since a signal must be sent uninterruptedly to the low-speed communication network synchronously with a certain transmission clock, a buffer memory, in general, is needed. However, the buffer memory is not necessary when transmission data is communicated in the form of a packet within the low-speed communication network within which a modulation code is employed. For example, at a terminal or a branch point of a low-speed communication network, after data items are assembled into packets, a preamble used for code-based synchronization is appended to the start of each packet. In this case, an overhead used for packet communication is also transmitted within the low-speed communication network.

Secondly, when data items are multiplexed using a modulation code only within a high-speed communication network, modulation and demodulation using a modulation code such as a spreading code are carried out at a branch point of a high-speed communication network to a packet communication network accommodating ATM exchanges.

In contrast, when each part of a network is formed with a communication network within which a modulation code such as a spreading code is utilized, code modulation and code demodulation are carried out at a terminal of the network. Furthermore, in a relatively large-scale network, code modulation and code demodulation are carried out between a high-speed communication network and low-speed communication network.

In a data communication system according to the present invention, data that is an object of transmission is sent to a code modulating means such as a code modulator included in a data communication unit. The code modulating means calculates the product of the data by a first modulation code such as a spreading code having a frequency band thereof spread. In other words, data that is an object of transmission is converted into a signal, in which a bit rate is a multiple of a bit rate of the bit clock of the data on the basis of a transmission clock having a transmission speed higher than the bit rate of the bit clock, and the thus converted signal is transmitted as a code-modulated signal.

Furthermore, the thus transmitted code-modulated signal is received, together with signals sent from the other data communication units by a code demodulating means such as a code demodulator. The code demodulating means calculates the product of the received code-modulated signal by a second modulation code while maintaining the synchronism with the second modulation code equivalent to the first modulation code. The data is thus restored readily.

As mentioned above, according to the present invention, a data communication system can modulate data using a modulation code such as a spreading code and manage data communications performed within a network on a centralized basis. The number of ATM exchanges requiring complex control for a plurality of ATM switches can be minimized, or the necessity thereof can be obviated. With circuitry simpler than the conventional circuitry, the length of a packet containing data can be readily adjusted depending on a communication type or depending on whether a network is designed for high-speed communication or low-speed communication, or the length of a packet containing data can be readily varied in response to a change request or the like concerning a data communication speed.

BRIEF DESCRIPTION OF THE DRAWINGS

The above object and features of the present invention will be more apparent from the following description of the preferred embodiments with reference to the accompanying drawings, wherein:

FIG. 16 is a circuit block diagram showing the configuration of the ninth preferred embodiment of the present invention; and FIG. 17 is a circuit block diagram showing the configuration of the tenth preferred embodiment of the present invention.

DESCRIPTION OF THE PREFERRED EMBODIMENTS

Hereinafter, a detailed description regarding preferred embodiments of the present invention will be given with reference to FIGS. 2 to 17.

Figure 1:
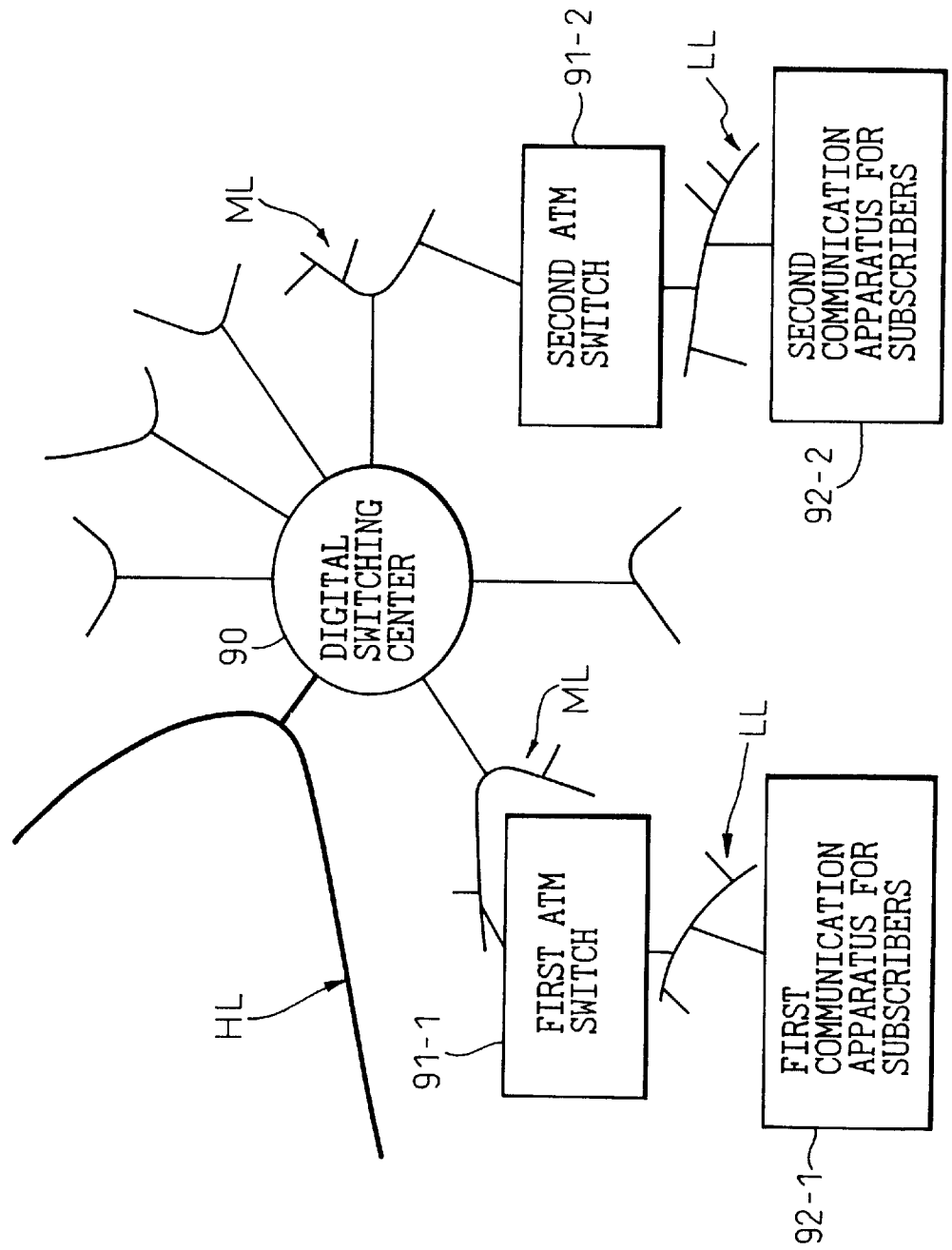
FIG. 1 is a circuit block diagram schematically showing the configuration of a data communication system utilizing light in accordance with the prior art.
Figure 2:
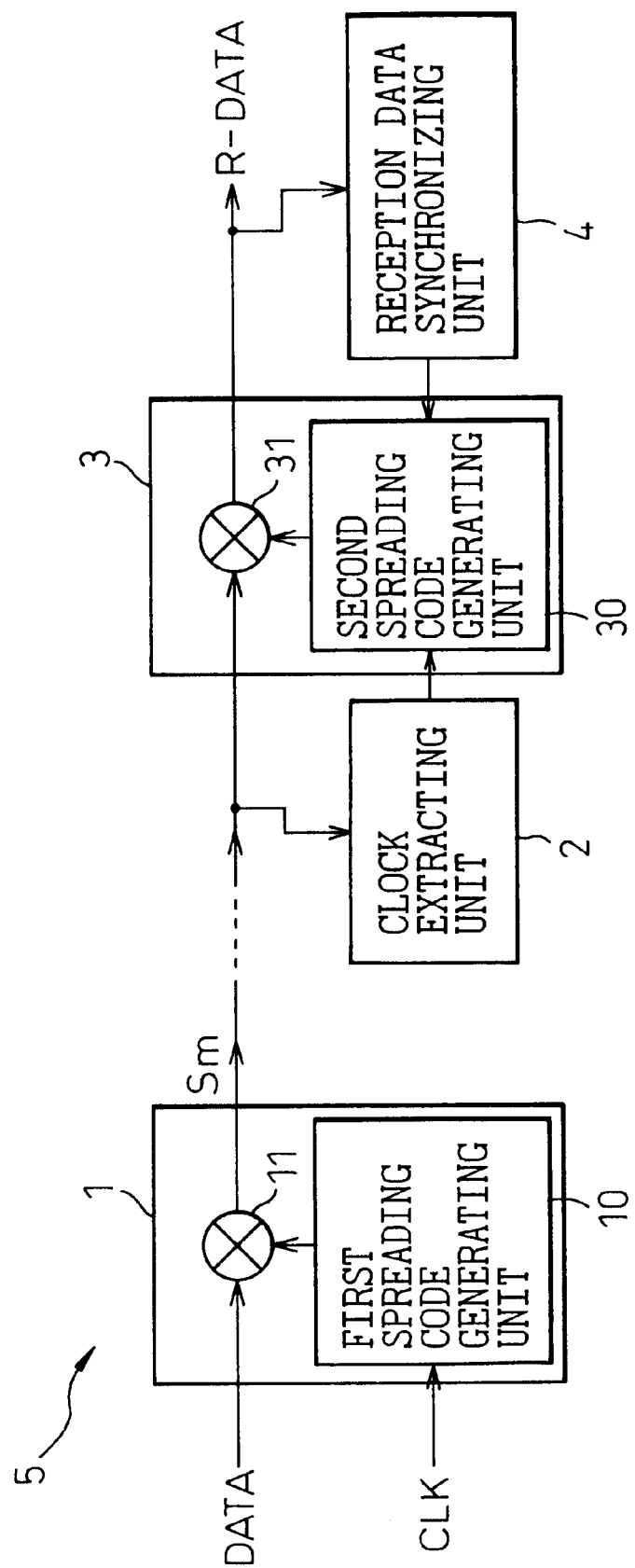
FIG. 2 is a block diagram showing the configuration of a basic embodiment based on the basic principles of the present invention.

FIG. 2 is a block diagram showing a basic embodiment based on the basic principles and constituent features of the present invention. However, for a clearer description of the principles of the present invention, the configuration of a data communication system 5 is illustrated schematically.

As shown in FIG. 2, the data communication system 5 in accordance with a basic embodiment based on the basic principles of the present invention comprises a code, modulating means 1 for generating a first modulation code on the basis of a transmission clock having a transmission speed equal to or higher than a bit rate of a bit clock of data that is an object of transmission, and multiplying each bit of the data by the first modulation code so as to generate a code-modulated signal Sm; a clock extracting unit 2 for extracting a reception clock, which has a transmission speed corresponding to the bit rate, from the thus received code-modulated signal Sm; and a code demodulating means 3 for generating a second modulation code equivalent to the first modulation code on the basis of the reception clock extracted by the clock extracting unit 2, and multiplying the received code-modulated signal Sm by the second modulation code so as to restore the data.

Furthermore, in the data communication system shown in FIG. 2, the code modulating means 1 includes a first spreading code generating unit 10 for generating, as the first modulation code, a first spreading code having a frequency band thereof spread on the basis of the transmission code; and a first multiplying unit 11 for multiplying the bits of the data by the first spreading code so as to spread a frequency spectrum of the data.

Furthermore, in the data communication system shown in FIG. 2, the code demodulating means 3 includes a second spreading code generating unit 30 for generating, as the second modulation code, a second spreading code equivalent to the first spreading code on the basis of a reception clock extracted by the clock extracting unit 2, and a second multiplying unit 31 for multiplying the received code-modulated signal Sm by the second spreading code so as to restore the data.

Furthermore, the data communication system shown in FIG. 2 further comprises a reception data synchronizing unit 4 for synchronizing the data restored by the code demodulating means 3 with the second modulation code and outputting reception data that is synchronized with the data according to the second modulation code.

In the data communication system shown in FIG. 2, the spread spectrum communication based on the CDMA or the like and used for radio communication as well as the code modulation is implemented. A modulation code and data are correlated at a branch point between networks having different communication speeds or at a terminal of a network, whereby a network having a high communication speed can branch out to a network having a low communication speed or data can be selected and transferred to a terminal. Data which is to be transmitted from a certain terminal is multiplied by the modulation code, whereby the frequency band of the data is broadened. When data items sent from other terminals are present, the data is sent together with the data items sent from other terminals to a branch point of the network having a high communication speed. If necessary, the data items are multiplied by the modulation code in order to broaden the frequency bands thereof, and then sent onto the network having a high communication speed. Owing to this technique, various data items ranging from data which is to be communicated at high speed through data which is to be communicated at low speed can be communicated smoothly. Moreover, the various data items can coexist within the data communication system.

In other words, in the data communication system shown in FIG. 2, data that is an object of transmission is sent to a code modulating means such as a code modulator incorporated in a data communication unit. The product of the data and a first modulation code such as a spreading code having a frequency band thereof spread is calculated. That is to say, the data that is an object of transmission is converted into a signal whose bit rate is several times higher than the bit rate of the bit clock of the data on the basis of a transmission clock which has a transmission speed equal to or higher than the bit rate of the data of the bit clock, and transmitted as a code-modulated signal.

Furthermore, the thus transmitted code-modulated signal is received, together with signals transmitted from other data communication units by means of a code demodulating means such as a code demodulator. The code demodulating means calculates the product of the received code-modulated signal by a second modulation code equivalent to the first modulation code while maintaining the synchronism with the second modulation code, and thus restores the data readily.

According to the data communication system having the aforesaid components, modulation using a modulation code such as a spreading code can be carried out and data communications which are to be performed within a network can be managed on a centralized manner. The number of ATM exchanges requiring complex control for a plurality of ATM switches or the like can be minimized, or the necessity of ATM exchanges can be obviated. With circuitry simpler than the known circuitry, the length of a packet containing data can be adjusted depending on a communication type or depending on whether a network is designed for high-speed communication or low-speed communication, or the length of a packet containing data can be varied readily in response to a change request concerning a data communication speed.

Figure 3:
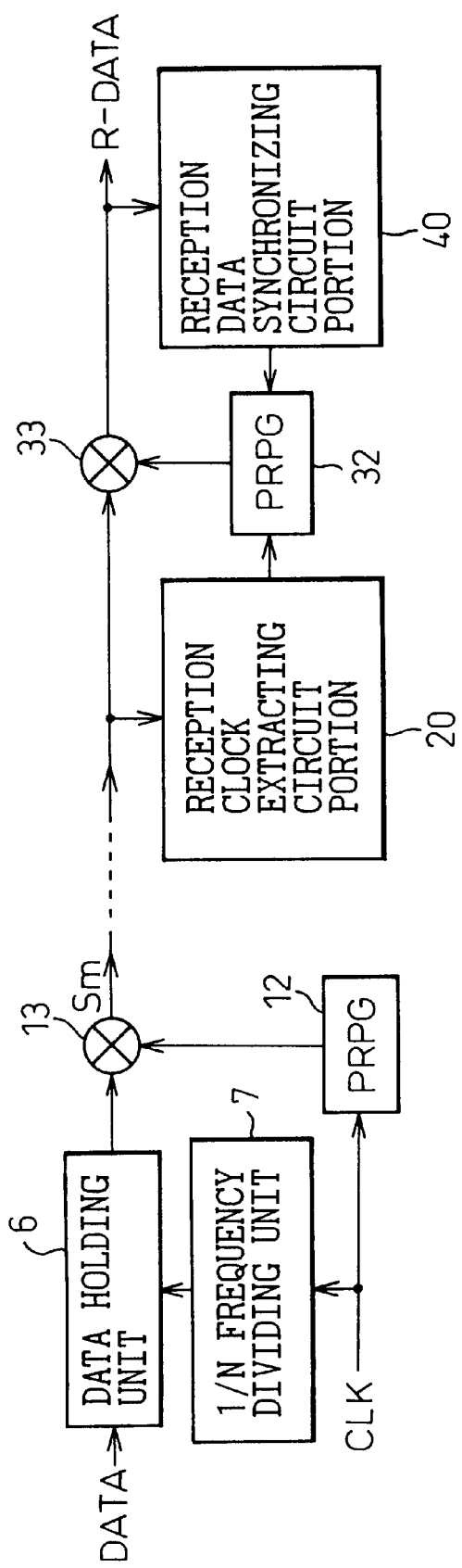
FIG. 3 is a circuit block diagram showing the configuration of the first preferred embodiment of the present invention.

FIG. 3 is a circuit block diagram showing the configuration of the first preferred embodiment of the present invention. Herein, emphasis will be put on components of a data communication system relevant to the present invention. Hereinafter, the same reference numerals will be assigned to components identical to those described previously.

As described in conjunction with the embodiment based on the basic principles of the present invention and illustrated in FIG. 2, a code modulating means 1 that is one constituent feature of the present invention includes a first spreading code generating unit 10 for generating as a first modulation code a first spreading code on the basis of a transmission clock having a transmission speed equal to or higher than a bit rate of a bit clock of data that is an object of transmission; and a first multiplying unit 11 for multiplying each bit of the data by the first spreading code so as to spread a frequency spectrum of the data.

Furthermore, as described in conjunction with the embodiment based on the basic principles of the present invention and illustrated in FIG. 2, a code demodulating means 3, that is one constituent feature of the present invention, includes a second spreading code generating unit 30 for generating, as a second modulation code equivalent to the first modulation code, a second spreading code equivalent to the first spreading code on the basis of a reception clock extracted by a clock extracting unit 2; and a second multiplying unit 31 for multiplying a received code-modulated signal Sm by the second spreading code so as to restore the data.

In the first preferred embodiment shown in FIG. 3, a transmission unit including a code modulator (code modulating means) which is to be installed in a transmitting side for transmitting data DATA that is an object of transmission, includes a transmission pseudo-random pulse generator (a pseudo-random pulse generator is generally abbreviated to PRPG) 12 for generating a cyclic code for transmission, which has a frequency band thereof spread and is composed of pseudo-random pulses, on the basis of a transmission clock having a transmission speed that is an integral multiple (for example, an N multiple where N denotes any positive integer; it can be assumed that N=1) of the pulse rate of a bit clock CLK determining the bit rate of the data that is an object of transmission (that is, a transmission clock whose frequency is an N multiple of the frequency of a bit clock CLK); and a transmission multiplier 13 for multiplying the bits of the data by the cyclic code for transmission so as to produce a code-modulated signal Sm.

In this case, the data DATA that is an object of transmission is held temporarily by a data holding unit 6 including D flip-flops or the like. On the other hand, a 1/N frequency dividing unit 7 produces a transmission clock having a transmission speed that is an N times multiple of the pulse rate of the bit clock CLX determining the bit rate of the data DATA. Furthermore, the data DATA held by the data holding unit 6 is input to the transmission multiplier 13 at a transmission speed, which is an N times multiple of the pulse rate of the bit clock CLK, on the basis of the transmission clock. The transmission multiplier 13 calculates the product of each bit of the input data by the cyclic code for transmission so as to produce a code-modulated signal Sm.

Preferably, a maximum-sequence pseudo-random pattern generator formed with a shift register in which data travels along a generally-known route or a GOLD code generator composed of a plurality of maximum-sequence (M-sequence) pseudo-random pattern generators may be used as the transmission pseudo-random pulse generator 12.

Furthermore, in the first embodiment shown in FIG. 3, a reception unit such as a code demodulator (code demodulating means) installed in a receiving side for receiving a code-modulated signal Sm, comprises a reception clock extracting circuit portion 20 for extracting a reception clock, which has a transmission speed corresponding to the pulse rate of the bit clock CLK, from the received code-modulated signal Sm; a reception pseudo-random pulse generator 32 for generating a cyclic code for reception, which is equivalent to the cyclic code for transmission and composed of pseudo-random pulses, on the basis of the reception clock extracted by the reception clock extracting circuit portion 20; and a reception multiplier 33 for multiplying the received code-modulated signal Sm by the cyclic code for reception so as to restore the data.

Preferably, a reception data synchronizing circuit portion 40 for synchronizing the data restored by the reception multiplier 33 with the cyclic code for reception and outputting reception data R-DATA that is synchronized with the data according to the cyclic code is included as a reception data synchronizing unit 4 (FIG. 2) that is one constituent feature of the present invention.

The reception pseudo-random pulse generator 32 generates a cyclic code for reception, which is equivalent to the cyclic code for transmission and composed of pseudo-random pulses, on the basis of a reception clock output from the reception clock extracting circuit portion 20. By the way, the code-modulated signal Sm received by the code demodulator is input to the reception multiplier 33. The reception multiplier 33 calculates the product of the code-modulated signal Sm by the cyclic code for reception so as to restore data. The reception data synchronizing circuit portion 40 synchronizes the restored data with the cyclic code for reception and can thus output reception data R-DATA equivalent to the original data DATA that has been transmitted.

Figure 4:
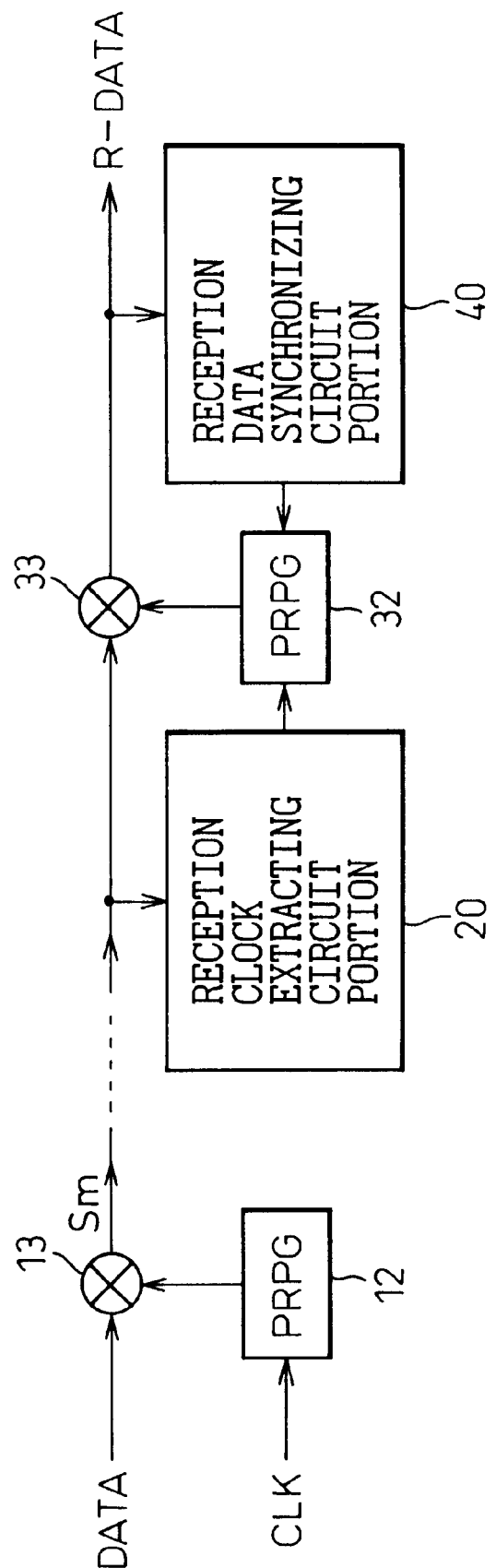
FIG. 4 is a circuit block diagram showing the configuration of the second preferred embodiment of the present invention.

FIG. 4 is a circuit block diagram showing the configuration of the second preferred embodiment of the present invention. Herein, emphasis will be put on a portion of a data communication system relevant to the present invention.

In a data communication system of the second embodiment shown in FIG. 3, the frequency of a transmission clock used to generate a cyclic code for transmission is not an integral multiple of the frequency of a bit clock CLK determining the bit rate of data DATA that is an object of transmission.

To be more specific, in FIG. 4, a transmission unit such as a code modulator which is to be installed in a transmitting side for transmitting data DATA that is an object of transmission, includes a transmission pseudo-random pulse generator 12 for generating a cyclic code for transmission, which has a frequency band thereof spread and is composed of pseudo-random pulses, on the basis of a transmission clock having a transmission speed higher than the pulse rate of a bit clock CLK determining the bit rate of the data DATA (but not an integral multiple of the pulse rate of the bit clock CLK determining the bit rate of the data DATA); and a transmission multiplier 13 for multiplying each bit of the data by the cyclic code for transmission so as to produce a code-modulated signal.

However, in the second embodiment, unlike the first embodiment, data DATA that is an object of transmission is input directly to the transmission multiplier 13. Furthermore, a frequency division circuit for providing an output whose frequency is an N times submultiple of the frequency of the bit clock CLK determining the bit rate of data DATA is not included. This embodiment is configured on the assumption that data whose signal-to-noise ratio is so excellent that the data can maintain a fine waveform even after modulated using a code is input to the code modulator.

The configuration of a reception unit such as a code demodulator in accordance with the second embodiment is identical to that of the reception unit in accordance with the first embodiment. The description of the reception unit will therefore be omitted.

Figure 5:
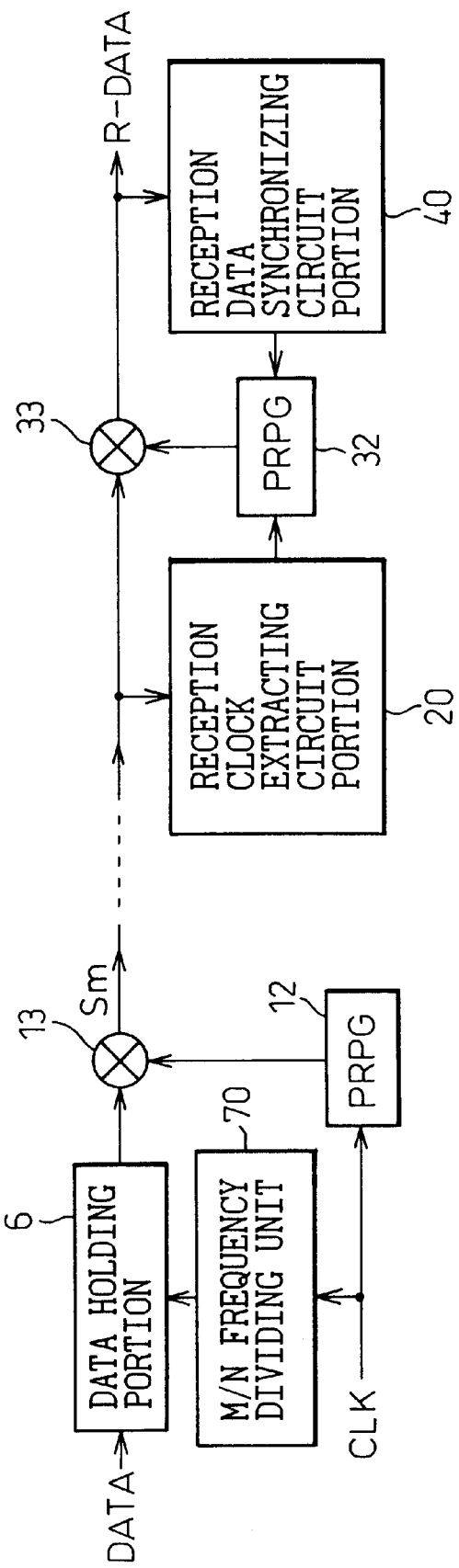
FIG. 5 is a circuit block diagram showing the configuration of the third preferred embodiment of the present invention.

FIG. 5 is a circuit block diagram showing the configuration of the third preferred embodiment of the present invention. Emphasis will be put on a portion of a data communication system relevant to the present invention.

In a data communication system of the third preferred embodiment shown in FIG. 5, the frequency of a transmission clock used to generate a cyclic code for transmission is an integral multiple (for example, an N multiple) of the frequency of a bit clock CLK determining the bit rate of data DATA that is an object of transmission, and the data DATA varies at intervals of time shorter than one cycle of a spreading code (for example, a 1/M cycle where M denotes any positive integer).

To be more specific, in FIG. 5, a transmission unit such as a code modulator which is to be installed in a transmitting side for transmitting data DATA that is an object of transmission includes a transmission pseudo-random pulse generator 12 for generating a cyclic code for transmission, which has a frequency band thereof spread and is composed of pseudo-random pulses, on the basis of a transmission clock having a transmission rate higher than the pulse rate of a bit clock CLK determining the bit rate of data DATA; and a transmission multiplier 13 for multiplying the data by the cyclic code for transmission in units of a plurality of bits so as to produce a code-modulated signal.

In the third embodiment, data DATA varies at intervals of time shorter than one cycle of a spreading code. The third embodiment therefore provides an advantage similar to the advantage exerted when modulation using a code is carried out for a relatively short period of time owing to the employment of a code having a small number of bits. However, preferably, data varying at intervals of a cycle corresponding to the length of the cyclic code is appended to a preamble so that the data and cyclic code can be synchronized quickly.

The configuration of a reception unit such as a code demodulator in accordance with the third embodiment is identical to that of the reception unit in accordance with the first or second embodiment. The description of the reception unit will therefore be omitted.

Figure 6:
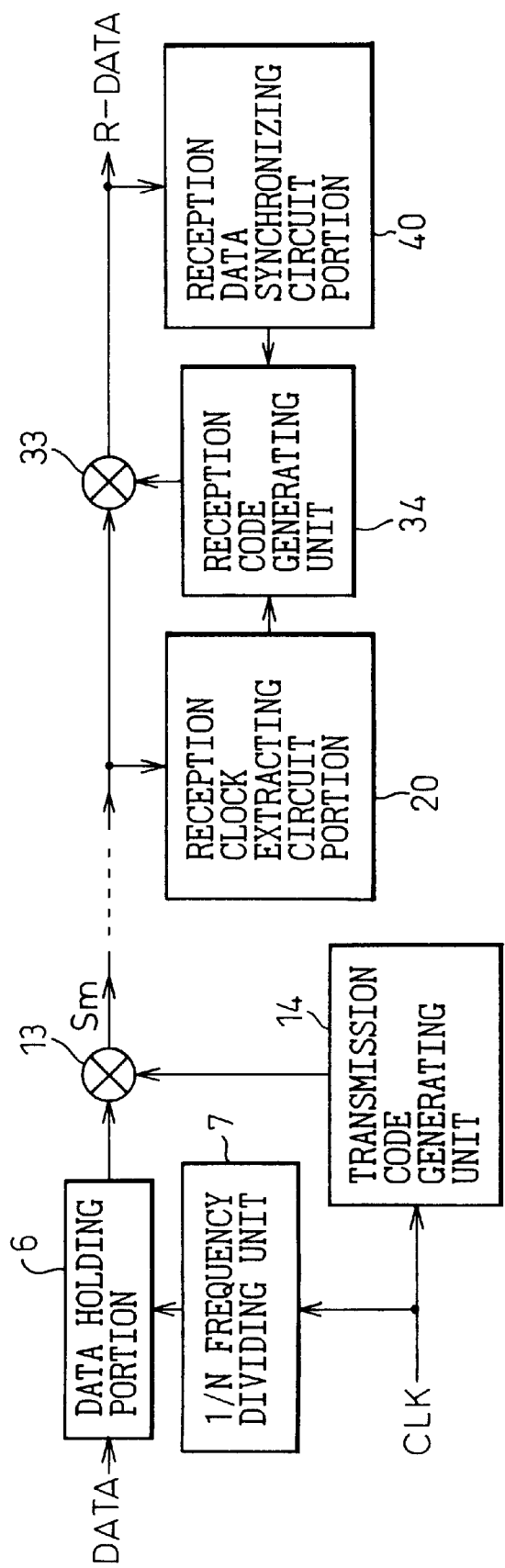
FIG. 6 is a circuit block diagram showing the configuration of the fourth preferred embodiment of the present invention.

FIG. 6 is a circuit block diagram showing the configuration of the fourth preferred embodiment of the present invention. Emphasis will be put on a portion of a data communication system relevant to the present invention.

In a data communication system of the fourth preferred embodiment shown in FIG. 6, a non-cyclic code that is not cyclic is substituted for the cyclic code for transmission in order to modulate and demodulate data.

To be more specific, in FIG. 6, a transmission unit such as a code modulator which is to be installed in a transmitting side for transmitting data DATA that is an object of transmission includes a transmission code generator 14 for generating a non-cyclic code for transmission, which has a frequency band thereof spread, on the basis of a transmission clock having a transmission speed that is an integral multiple of the bit rate of the bit clock of the data; and a transmission multiplier 13 for multiplying each bit of the data by the non-cyclic code for transmission so as to produce a code-modulated signal Sm.

In this case, the data DATA that is an object of transmission is, like the one in accordance with the first embodiment, held temporarily by a data holding unit 6 including D flip-flops. By the way, a 1/N frequency dividing unit 7 produces a transmission clock having a transmission speed that is an N times multiple of the pulse rate of a bit clock CLK determining the bit rate of the data DATA. The transmission multiplier 13 multiplies each bit of the data sent from the data holding unit 6 by the cyclic code for transmission so as to produce a code-modulated signal Sm.

Shown is the configuration of a data communication system in which a non-cyclic code that is not cyclic is used as a spreading code. It should be noted that a substantially non-cyclic code may be created by frequently changing cyclic codes, such as a maximum sequence and Gold code, and used for modulation.

Furthermore, the fourth embodiment may be implemented in a data communication system (of the third embodiment) in which the frequency of a transmission clock used to produce a cyclic code for transmission is an integral multiple of the frequency of a bit clock CLK determining the bit rate of data DATA that is an object of transmission, and the data DATA varies at intervals of time shorter than one cycle of a spreading code. In this case, an M/N frequency dividing unit is substituted for the 1/N frequency dividing unit.

Furthermore, in the fourth embodiment shown in FIG. 6, a reception unit such as a code demodulator which is to be placed in a receiving side for receiving a code-modulated signal Sm, includes a reception clock extracting circuit portion 20 for extracting a reception clock, which has a transmission speed corresponding to the pulse rate of a bit clock CLK determining the bit rate of data, from the received code-modulated signal Sm; a reception code generating unit 34 for generating a non-cyclic code for reception, which is equivalent to the non-cyclic code for transmission, on the basis of the reception clock extracted by the reception clock extracting circuit portion 20; and a reception multiplier 33 for multiplying the received code-modulated signal Sm by the non-cyclic code for reception so as to restore the data.

The reception code generating unit 34 generates a non-cyclic code, which is equivalent to the non-cyclic code for transmission, on the basis of the reception clock output from the reception clock extracting circuit portion 20. In contrast, the reception multiplier 33 calculates the product of the code-modulated signal Sm by the non-cyclic code for reception so as to restore data. The reception data synchronizing circuit portion 40 synchronizes the restored data with the non-cyclic code for reception. Thus, reception data R-DATA, equivalent to the original data DATA that has been transmitted, can be output.

Figure 7:
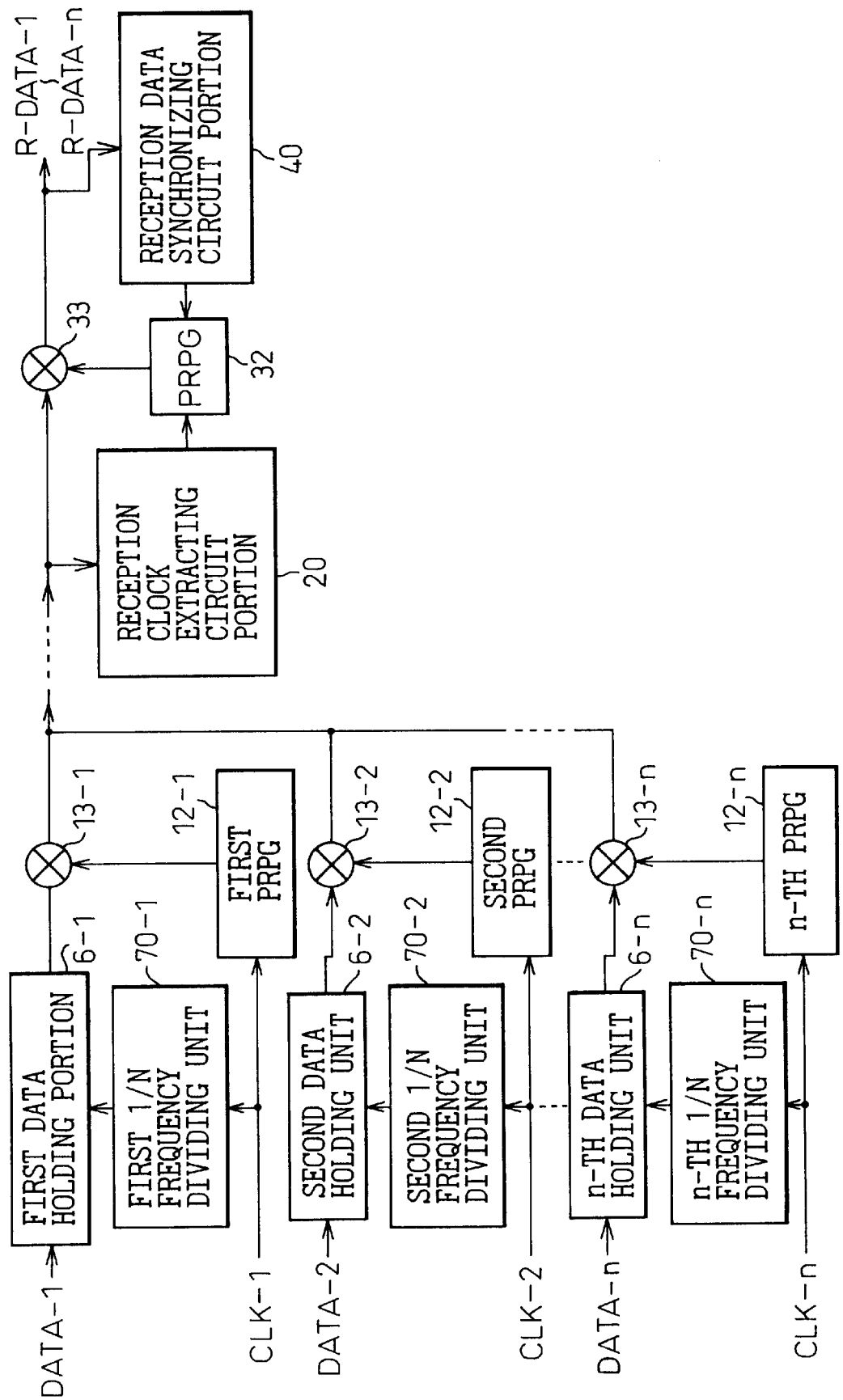
FIG. 7 is a circuit block diagram showing the configuration of the fifth preferred embodiment of the present invention.

FIG. 7 is a circuit block diagram showing the configuration of the fifth preferred embodiment of the present invention. Shown as an example is a data communication system in which all or some of the code transmitters sharing a transmission line output a plurality of kinds of code-modulated signals without synchronizing them with a transmission clock.

In the fifth preferred embodiment shown in FIG. 7, a transmission unit such as a code modulator to be placed in a transmitting side for transmitting a plurality of kinds of data items DATA-1 to DATA-n (where n is any positive integer equal to or larger than 2) that are objects of transmission includes first to n-th transmission pseudo-random pulse generators (first to n-th PRPGS) 12-1 to 12-$n$ for generating a plurality of kinds of cyclic codes for transmission, each of which has a frequency band thereof spread and is composed of pseudo-random pulses, on the basis of a plurality of kinds of transmission respectively having transmission speeds that are N (where N denotes any positive integer) times multiples of the pulse rates of a plurality of kinds of bit clocks CLK-1 to CLK-n determining the bit rates of a plurality of kinds of data items DATA-1 to DATA-n that are objects of transmission, and first to n-th transmission multipliers 13-1 to 13-$n$ for multiplying each bit of the plurality of kinds of data items by the plurality of kinds of cyclic codes for transmission so as to produce a plurality of kinds of code-modulated signals.

In this case, the plurality of kinds of data items DATA-1 to DATA-n that are objects of transmission are held temporarily by first to n-th data holding units 6-1 to 6-$n$ each including D flip-flops (D-FF). First to n-th 1/N frequency dividing units 70-1 to 70-$n$ produce a plurality of kinds of transmission clocks respectively having transmission speeds that are N times multiples of the pulse rates of the bit clocks CLK-1 to CLK-n determining the bit rates of the plurality of data items DATA-1 to DATA-n. Furthermore, the plurality of kinds of data items DATA-1 to DATA-n held by the first to n-th data holding units 6-1 to 6-$n$ are input to the first to n-th transmission multipliers 13-1 to 13-$n$, at the transmission speeds which are N multiples of the pulse rates of the bit clocks, on the basis of the plurality of kinds of transmission clocks. The first to n-th transmission multipliers 13-1 to 13-$n$ calculate the products of the bits of the plurality of kinds of input data items DATA-1 to DATA-n by the plurality of kinds of cyclic codes for transmission so as to produce a plurality of kinds of code-modulated signals.

Furthermore, in the fifth embodiment shown in FIG. 7, a reception unit such as a code demodulator to be placed in a receiving side for receiving a plurality of kinds of code-modulated signals, includes a reception clock extracting circuit portion 20 for extracting reception clocks, which have transmission speeds corresponding to the pulse rates of the plurality of kinds of clocks CLK-1 to CLK-n determining the bit rates of data items, respectively, from the plurality of kinds of received code-modulated signals; a reception pseudo-random pulse generator 32 for generating cyclic codes for reception, which are equivalent to the plurality of kinds of cyclic codes for transmission and are each composed of pseudo-random pulses; and a reception multiplier 33 for multiplying the plurality of kinds of received code-modulated signals by the cyclic codes for reception so as to restore the plurality of kinds of data items DATA-1 to DATA-n.

Preferably, a reception data synchronizing circuit portion 40 for synchronizing the plurality of kinds of data items DATA-1 to DATA-n restored by the reception multiplier 33 with the cyclic codes for reception, and outputting a plurality of kinds of reception data items R-DATA-1 to R-DATA-n that are synchronized with the plurality of kinds of data items DATA-1 to DATA-n according to the cyclic codes is included as a reception data synchronizing unit 4 (FIG. 2) that is one constituent feature of the present invention.

The reception pseudo-random pulse generator 32 generates cyclic codes for reception, which are equivalent to the plurality of kinds of cyclic codes for transmission and are each composed of pseudo-random pulses, on the basis of the reception clocks output from the reception clock extracting circuit 20. The plurality of kinds of code-modulated signals received by the code demodulator are input to the reception multiplier 33. The reception multiplier 33 calculates the products of the plurality of kinds of code-modulated signals and the cyclic codes for reception so as to restore the plurality of kinds of data items DATA-1 to DATA-n. The reception data synchronizing circuit portion 40 synchronizes the plurality of kinds of restored data items with the cyclic codes for reception. Thus, a plurality of kinds of reception data items R-DATA-1 to R-DATA-n that are equivalent to the plurality of kinds of original data items DATA-1 to DATA-n that have been transmitted can be output.

In the fifth embodiment, the plurality of kinds of code-modulated signals produced by calculating the products of the bits of the plurality of kinds of data items DATA-1 to DATA-n by the plurality of kinds of cyclic codes for transmission, exhibit mutually different data patterns as far as the same timing is concerned. Even if the plurality of kinds of code-modulated signals are multiplexed, they can be identified clearly.

According to the fifth embodiment, even though the plurality of kinds of bit clocks whose pulse rates determine the bit rates of a plurality of kinds of data items, and the plurality of kinds of transmission clocks are not synchronized with each other, the plurality of kinds of code-modulated signals can be multiplexed and transmitted.

Furthermore, the configuration according to the fifth embodiment can be adapted to a data communication system, in which transmission speeds at which a plurality of kinds of transmission clocks are transmitted are higher than the pulse rates of bit clocks determining the bit rates of a plurality of kinds of data items that are objects of transmission, and the transmission speeds are not integral multiples of the pulse rates of the bit clocks. In this case, the first to n-th data holding units and the first to n-th 1/N frequency dividing units are unnecessary.

Furthermore, the configuration according to the fifth embodiment can be adapted to a data communication system in which non-cyclic codes are substituted for the cyclic codes in order to modulate and demodulate a plurality of kinds of data items. In this case, first to n-th transmission code generators for generating non-cyclic codes that are not cyclic are substituted for the first to n-th transmission pseudo-random pulse generators.

Figure 8A:
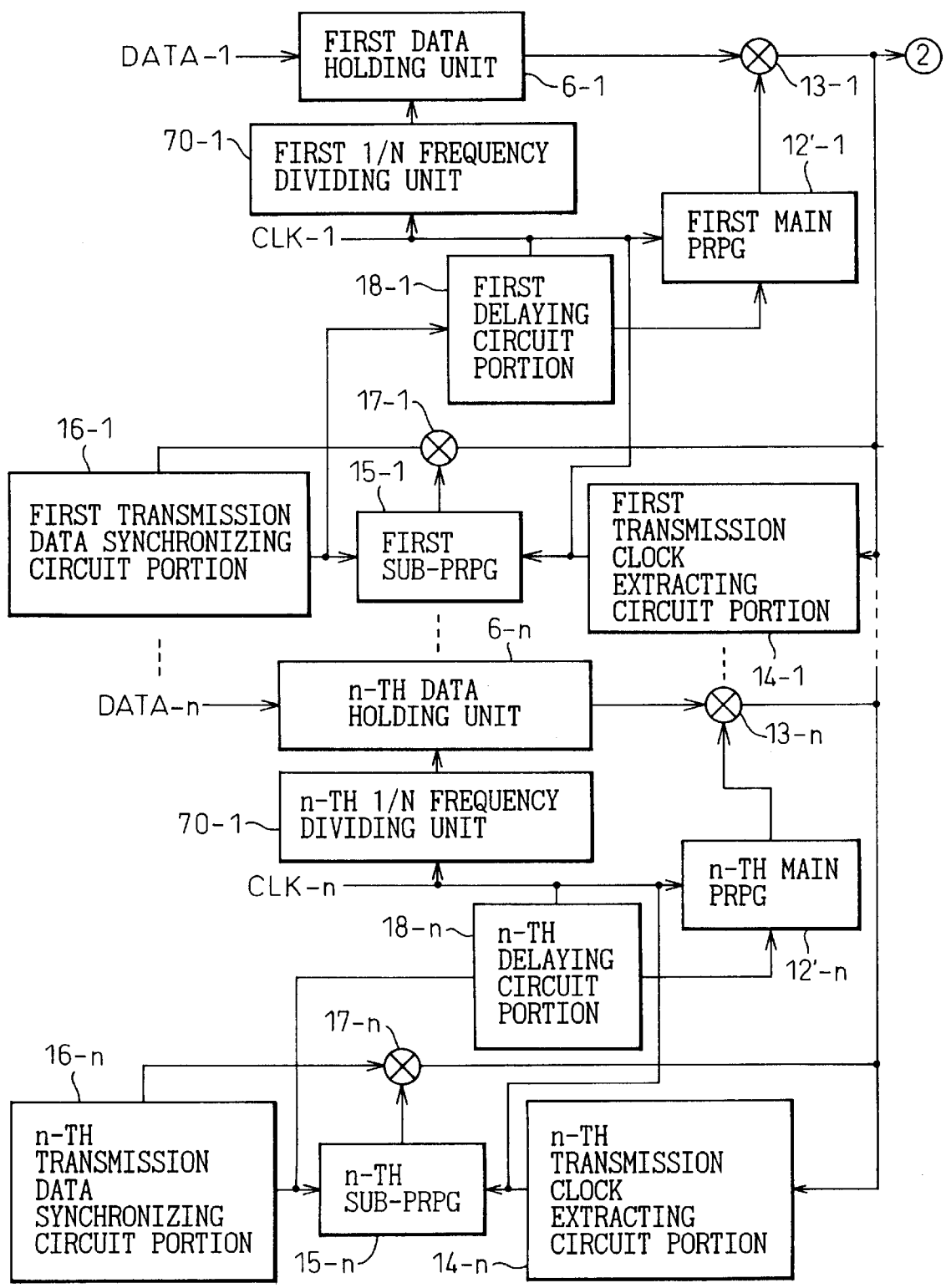
FIGS. 8A and 8B are circuit block diagrams each showing the configuration of the sixth preferred embodiment of the present invention.
Figure 8B:
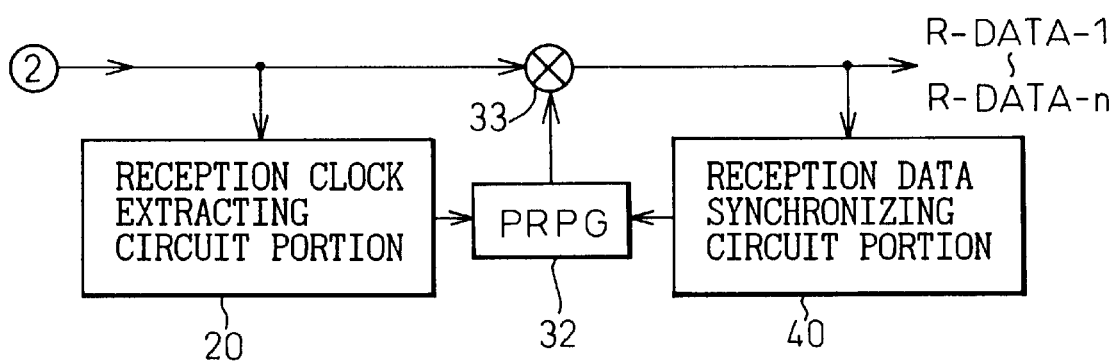

FIGS. 8A and 8B are circuit block diagrams each showing the configuration in accordance with the sixth preferred embodiment of the present invention. Shown, as an example, is a data communication system in which a plurality of kinds of code-modulated signals being transmitted are monitored all the time while a transmission clock used to transmit one of a plurality of kinds of data items is made out of phase with respect to the transmission clocks used to transmit the other data items.

In the sixth preferred embodiment shown in FIG. 8A, like the fifth embodiment, a transmission unit such as a code modulator which is to be placed in a transmitting side for transmitting a plurality of kinds of data items DATA-1 to DATA-n that are objects of transmission includes first to n-th main transmission pseudo-random pulse generators (first to n-th main PRPGs) 12'-1 to 12'-n for generating a plurality of kinds of cyclic codes for transmission, each of which has a frequency band thereof spread and is composed of pseudo-random pulses, on the basis of a plurality of kinds of transmission clocks respectively having transmission speeds that are N multiples of the pulse rates of a plurality of kinds of A bit clocks CLK-1 to CLK-n determining the bit rates of a plurality of kinds of data items DATA-1 to DATA-n that are objects of transmission, and first to n-th transmission multipliers 13-1 to 13-n for multiplying each bit of the plurality of kinds of data items by the plurality of kinds of cyclic codes for transmission.

In this case, the plurality of kinds of data items DATA-1 to DATA-n that are objects of transmission are held temporarily by first to n-th data holding units 6-1 to 6-n each including D flip-flops. First to n-th 1/N frequency dividing units 70-1 to 70-n produce a plurality of kinds of transmission clocks respectively having transmission speeds that are N multiples of the pulse rates of the plurality of kinds of bit clocks CLK-1 to CLK-n determining the bit rates of the plurality of kinds of data items DATA-1 to DATA-n. Furthermore, the plurality of kinds of data items DATA-1 to DATA-n held by the first to n-th data holding units 6-1 to 6-n are input to first to n-th transmission multipliers 13-1 to 13-n at the transmission speeds, which are N multiples of the pulse rates of the bit clocks, on the basis of the plurality of kinds of transmission clocks. The first to n-th transmission multipliers 13-1 to 13-n calculate the products of the bits of the plurality of kinds of data items DATA-1 to DATA-n by the plurality of kinds of cyclic codes for transmission so as to produce a plurality of kinds of code-modulated signals.

In the sixth embodiment shown in FIG. 8A, the code transmitter further includes first to n-th transmission clock extracting circuit portions 14-1 to 14-n for monitoring the plurality of kinds of the thus produced code-modulated signals all the time and extracting the plurality of kinds of transmission clocks from the plurality of kinds of code-modulated signals which are being transmitted for the purpose of delaying the code-modulated signals by given phase delays; first to n-th sub-reception pseudo-random pulse generators (first to n-th sub-PRPGs) 15-1 to 15-n associated with the first to n-th main PRPGs for the purpose of generating cyclic codes for phase delay, which are equivalent to the plurality of kinds of cyclic codes for transmission and are each composed of pseudo-random pulses; and first to n-th phase delay multipliers 17-1 to 17-n for multiplying each bit of the plurality of kinds of data items DATA-1 to DATA-n by the cyclic codes for phase delay output from the first to n-th sub-PRPGs.

The code transmitter further includes first to n-th transmission data synchronizing circuit portions 16-1 to 16-n for synchronizing the plurality of kinds of code-modulated signals, which are output from the first to n-th phase delay multipliers and are objects of phase delay, with the cyclic codes for phase delay, and outputting a plurality of kinds of code-modulated signals that are synchronized with the plurality of kinds of data items DATA-1 to DATA-n according to the cyclic codes and are objects of phase delay.

The code transmitter further includes first to n-th delaying circuit portions 16-1 to 16-n for delaying a plurality of kinds of code-modulated signals, which are objects of phase delay, by given phase delays so as to shift phases of the plurality of kinds of code-modulated signals from each other, which are output from the first to n-th phases delay multipliers and are objects of phase delay, relative to the original code-modulated signals.

Furthermore, in the sixth embodiment shown in FIG. 8B, a reception unit such as a code demodulator which is to be placed in a receiving side for receiving a plurality of code-modulated signals that are mutually out of phase includes, like the one in the fifth embodiment, a reception clock extracting circuit portion 20 for extracting reception clocks, which have transmission speeds corresponding to the pulse rates of a plurality of kinds of bit clocks CLK-1 to CLK-n determining the bit rates of data items, respectively, from the plurality of kinds of received code-modulated signals; a reception pseudo-random pulse generator 32 for generating cyclic codes for reception, which are equivalent to the plurality of kinds of cyclic codes for transmission and are each composed of pseudo-random pulses, on the basis of the reception clocks extracted by the reception clock extracting circuit portion 20; and a reception multiplier 33 for multiplying the plurality of kinds of received code-modulated signals by the cyclic codes for reception so as to restore the plurality of kinds of data items DATA-1 to DATA-n.

Preferably, a reception data synchronizing circuit portion 40 for synchronizing the plurality of kinds of data items DATA-1 to DATA-n restored by the reception multiplier 33 with the cyclic codes for reception and outputting a plurality of kinds of reception data items R-DATA-1 to R-DATA-n that are synchronized with the plurality of kinds of data items DATA-1 to DATA-n according to the cyclic codes, is provided as a reception data synchronizing unit 4 (FIG. 2) that is a constituent feature of the present invention.

The reception pseudo-random pulse generator 32 generates cyclic codes for reception, which are equivalent to the plurality of kinds of cyclic codes for transmission and are each composed of pseudo-random pulses, on the basis of the reception clocks output from the reception clock extracting circuit portion 20. A plurality of kinds of code-modulated signals that are received by the code demodulator and are mutually out of phase, are input to the reception multiplier 33. The reception multiplier 33 calculates the products of the plurality of kinds of code-modulated signals by the cyclic codes for reception so as to restore the plurality of kinds of data items DATA-1 to DATA-n. The reception data synchronizing circuit portion 40 synchronizes the plurality of kinds of restored data items with the cyclic codes for reception and outputs the plurality of kinds of reception data items R-DATA-1 to R-DATA-n that are equivalent to the plurality of kinds of original transmitted data items DATA-1 to DATA-n.

In the sixth embodiment, since the first to n-th sub-PRPGs 15-1 to 15-n, first to n-th phase delay multipliers 17-1 to 17-n, and first to n-th delaying circuit portions 18-1 to 18-n are included in the code transmitter, phases of the transmission clocks used to transmit a plurality of kinds of data items can be shifted relative to those used to transmit other data items concurrently with the data items. This makes it possible to reuse modulation codes, that is, the cyclic codes. The advantage that the modulation codes can be reused is intensified especially when a plurality of kinds of data items whose bit rates are high are transmitted. When the plurality of kinds of transmission clocks are mutually out of phase, a receiving side for receiving modulation code signals can readily synchronize restored data items with original data items according to the modulation codes.

Furthermore, the configuration in accordance with the sixth embodiment can be adapted to a data communication system in which transmission rates at which a plurality of transmission clocks are transmitted are higher than the pulse rates of bit clocks determining the bit rates of a plurality of kinds of data items that are objects of transmission, but are not integral multiples of the pulse rates of the bit clocks. In this case, the first to n-th data holding units and the first to n-th 1/N frequency dividing units are unnecessary.

Furthermore, the configuration in accordance with the sixth embodiment can be adapted to a data communication system in which non-cyclic codes are substituted for the cyclic codes in order to modulate and demodulate a plurality of kinds of data items. In this case, first to n-th main transmission code generators and first to n-th sub-transmission code generators, which generate non-cyclic codes that are not cyclic, are substituted for the first to n-th main PRPGs and the first to n-th sub-PRPGs.

Figure 9:
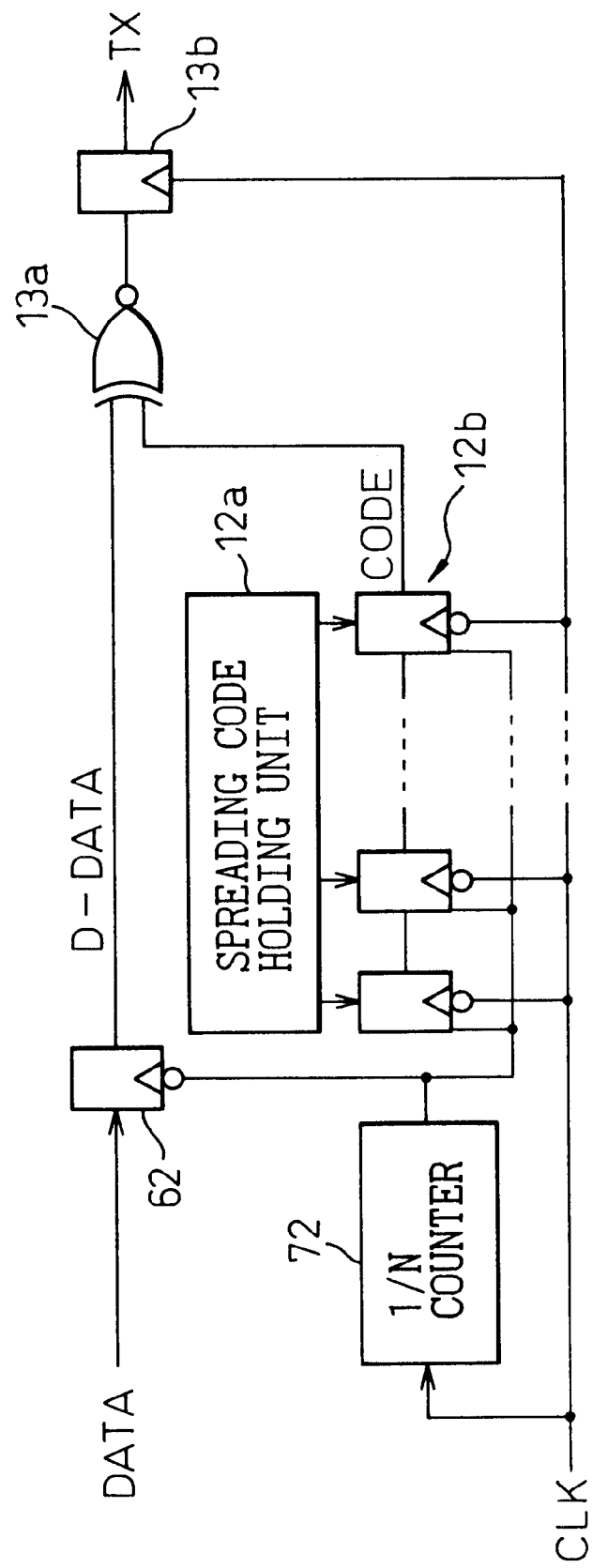
FIG. 9 is a circuit block diagram showing a practical example of a transmission unit in accordance with an embodiment of the present invention.
Figure 10:
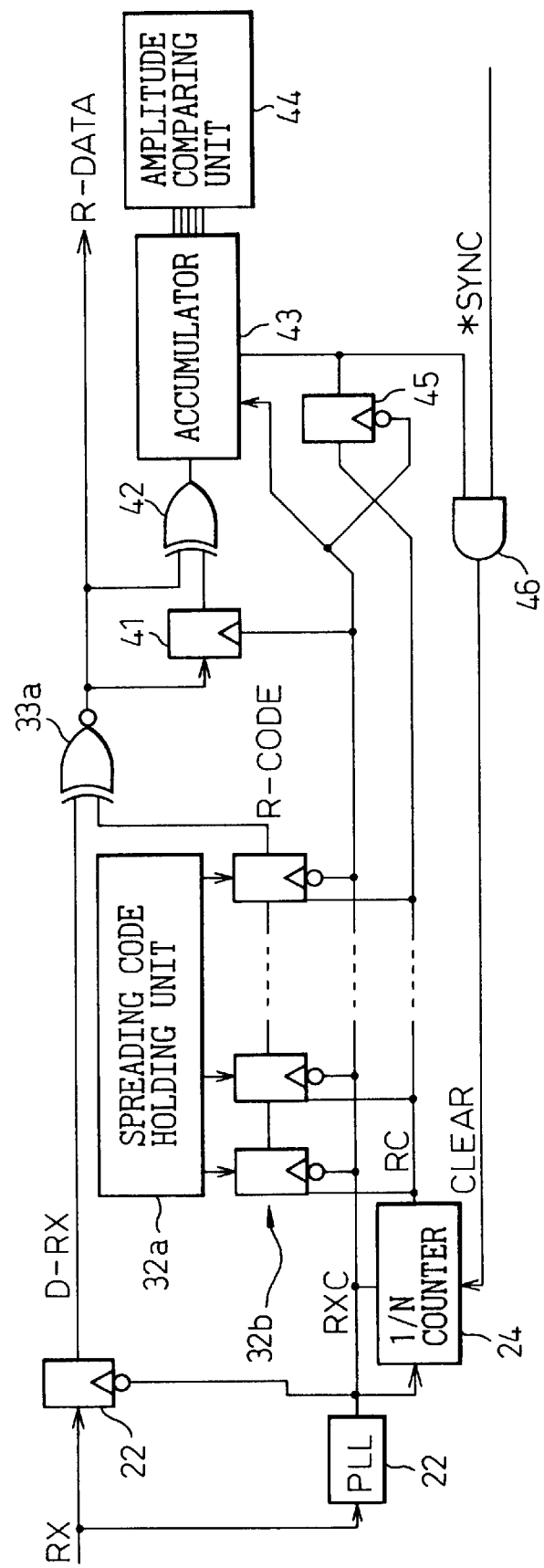
FIG. 10 is a circuit block diagram showing a practical example of a reception unit in accordance with a typical embodiment of the present invention.
Figure 11:
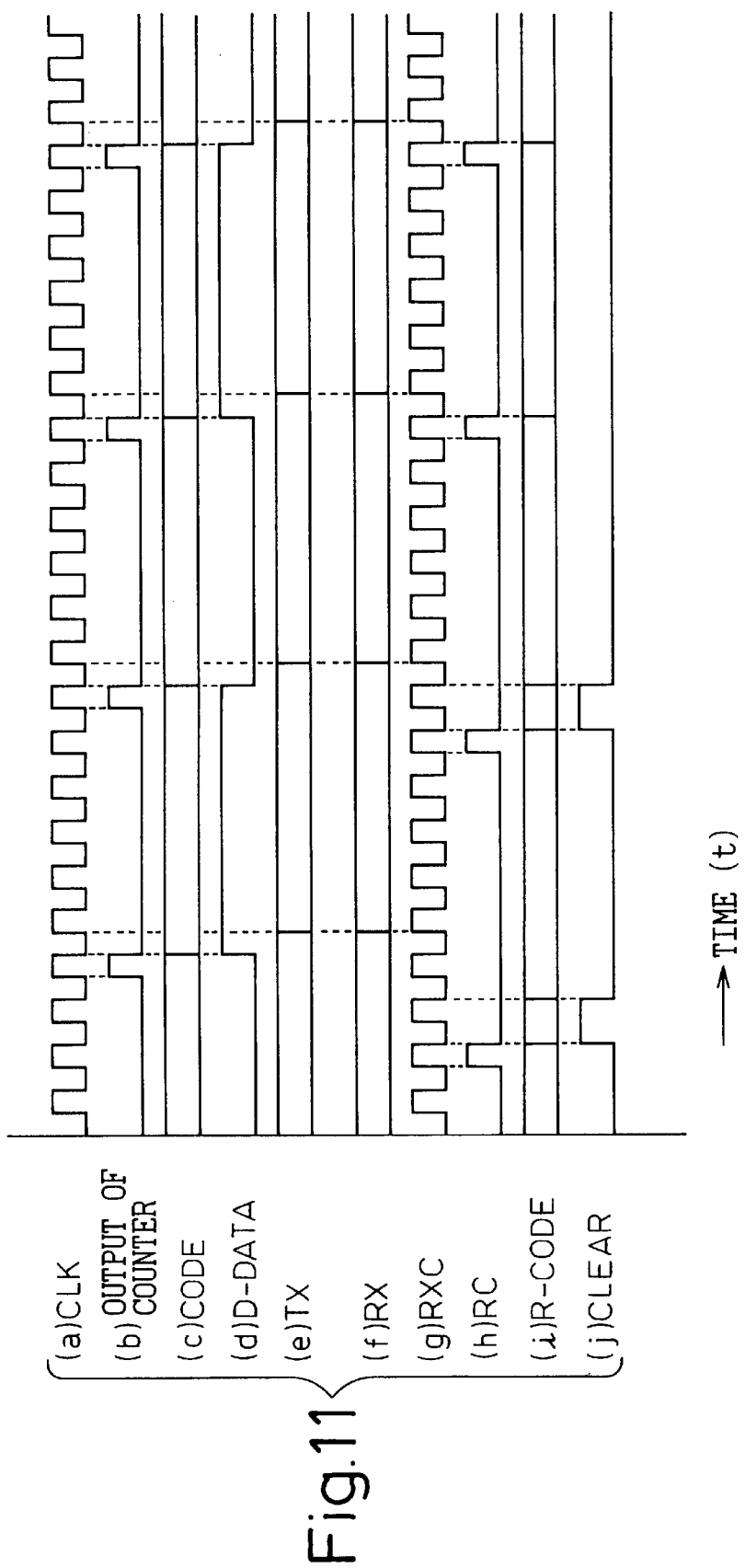
FIG. 11 is a timing chart showing waveforms of voltages produced by components shown in FIGS. 9 and 10.

FIG. 9 is a circuit block diagram showing a practical example of a transmission unit in accordance with a typical embodiment of the present invention; FIG. 10 is a circuit block diagram showing a practical example of a reception unit in accordance with a typical embodiment of the present invention; and FIG. 11 is a timing chart showing waveforms of voltages produced by components shown in FIGS. 9 and 10 (changes in the voltage level of digital signals in relation to time t). In FIG. 9, a practical example of a logic circuit forming a transmission unit employed in the first embodiment (FIG. 3) is shown as a typical example. The practical configuration of the transmission unit is not limited to the configuration in accordance with the first embodiment. In FIG. 10, a practical example of a logic circuit forming a reception unit employed in the first embodiment (FIG. 3) is shown as a typical example. The practical configuration of the reception unit is not limited to the configuration in accordance with the first embodiment.

The transmission unit shown in FIG. 9 includes a D flip-flop (D-FF) 62 having a capability of a data holding unit for temporarily holding data DATA that is an object of transmission, and a 1/N counter 72 having the capability of a 1/N frequency dividing unit for producing a transmission clock which has a transmission speed that is an N multiple of the pulse rate of a bit clock CLK determining the bit rate of the data DATA.

Furthermore, in the transmission unit shown in FIG. 9, a transmission pseudo-random pulse generator 12 (FIG. 3) for generating a cyclic code for transmission, which has a frequency band thereof spread and is composed of pseudo-random pulses, on the basis of the transmission clock (that is, a transmission clock whose frequency is an N multiple of the clock frequency fc of a bit clock CLK determining the bit rate of data) includes a spreading code holding unit 12a formed with a ROM (read-only memory) or register for holding a spreading code such as a cyclic code in advance; and a shift register 12b which is composed of a plurality of D flip-flops and in which a cyclic code CODE is loaded periodically in response to an output of the 1/N counter 72.

In the transmission unit shown in FIG. 9, the transmission multiplier 13 (FIG. 3) for multiplying the bits of the data DATA by the cyclic code CODE, includes an exclusive NOR (ENOR) gate 13a for logically multiplying held data D-DATA sent from the D flip-flop 62 and the cyclic code CODE sent from the shift register 12b; and a D flip-flop (D-FF) 13b for holding transmission data which produces transmission data TX while synchronizing a code-modulated signal output from the exclusive NOR gate 13a with the transmission clock.

In the transmission unit formed with the logic circuit having the foregoing circuit elements, as seen from the timing chart of FIG. 11, the 1/N counter 72 produces a transmission clock having a transmission speed (portion (b) of FIG. 11) that is an N multiple of the pulse rate of a bit clock CLK determining the bit rate of data DATA that is an object of transmission (portion (a) of FIG. 11). Moreover, a spreading code such as a cyclic code CODE is periodically loaded from the spreading code holding unit 12a to the shift register 12b (portion (c) of FIG. 11). The held data D-DATA output from the D flip-flop 62 (portion (d) of FIG. 11) is multiplied by the cyclic code CODE, whereby transmission data TX containing a code-modulated signal to be transmitted at the transmission speed that is an N times multiple of the bit rate of the original data DATA is generated (portion (e) of FIG. 11).

In the reception unit shown in FIG. 10, a PLL (PLL is the abbreviation for phase-locked loop) 21 for adjusting the phase of a reception signal RX produced by receiving a code-modulated signal from the transmission unit and extracting a reception clock RXC which has a transmission speed corresponding to the pulse rate of the bit clock CLK determining the bit rate of the original data DATA, is provided as a reception clock extracting circuit portion 20 shown in FIG. 3.

The reception unit shown in FIG. 10 further includes a D flip-flop (D-FF) 22 for temporarily holding the reception signal RX; and a 1/N counter 24 having the capability of a 1/N frequency dividing unit for producing a clock RC for code demodulation (that is, a clock RC for code demodulation whose frequency is an N multiple of the clock frequency fc of a bit clock CLK whose pulse rate determines the bit rate of data), which has a transmission speed that is an N multiple of the pulse rate of the bit clock CLK determining the bit rate of the data, on the basis of a reception clock RXC extracted by the PLL 21.

Furthermore, in the reception unit shown in FIG. 10, the reception pseudo-random pulse generator 32 (FIG. 3) for producing a cyclic code R-CODE for reception, which is equivalent to the cyclic code CODE handled by the transmission unit, on the basis of the reception clock RXC extracted by the PLL 21, includes a spreading code holding unit 32a formed with a ROM or register for holding a spreading code such as a cyclic code for reception in advance; and a shift register 32b which is composed of a plurality of D flip-flops and in which the cyclic code R-CODE for reception is loaded periodically in response to an output of the 1/N counter 24.

Furthermore, in the reception unit shown in FIG. 10, the reception multiplier 33 (FIG. 3) for multiplying the reception signal RX by the cyclic code R-CODE for reception so as to restore the original data DATA includes an exclusive NOR (ENOR) gate 33a for logically multiplying the held reception data R-DATA sent from the D flip-flop 22 by the cyclic code R-CODE sent from the shift register 32b.

Furthermore, in the reception unit shown in FIG. 10, the reception data synchronizing circuit portion 40 shown in FIG. 3 includes a D flip-flop (D-FF) 41 for holding reception data which synchronizes reception data R-DATA output from the exclusive NOR gate 33a with the reception clock RXC, an exclusive OR (EOR) gate 42 for detecting the inconsistency of an output signal of the D flip-flop 41 for holding reception data with the reception data R-DATA; an accumulator 43 for accumulating a result of detection provided by the exclusive OR gate 42 on the basis of the reception clock RXC; and an amplitude comparing unit 44 formed with a magnitude comparator (MC) or the like for comparing a frequency, at which the reception data R-DATA cannot be synchronized with the reception clock RXC, with a predetermined permissible value on the basis of a result of accumulation provided by the accumulator 43.

When the frequency at which the reception data R-DATA cannot be synchronized with the reception clock RXC exceeds the predetermined permissible value, the amplitude comparing unit 44 produces a code synchronizing signal *SYNC indicating the above situation and inputs this signal to an AND gate 46. The amplitude comparing unit 44 delays a clock RC for code modulation by one cycle of the reception clock RXC, and inputs the resultant clock to the AND gate 46, via the D flip-flop 45 for delaying reception data. An output signal from the AND gate 46 is input as a clear signal CLEAR, which is used to reset an output of the 1/N counter 24, to the 1/N counter 24.

To be more specific, as shown in the timing chart of FIG. 11, the reception signal RX handled by the reception unit (waveform (f) in FIG. 11) is tracked as described below according to a cyclic code such as a spreading code on the basis of the reception clock RXC (waveform (g) in FIG. 11) reproduced by the PLL 21.

At the time instant in which reception of the reception signal RX is started, normally, the reception signal RX is not synchronized with a cyclic code. While the reception signal RX remains asynchronous with the cyclic code, the 1/N counter 24 counts pulses of the reception clock RXC (waveform (h) in FIG. 11) during a period corresponding to the length of the cyclic code, and supplies the count value to the shift register 32b. As a result, a cyclic code for reception R-CODE (waveform (i) in FIG. 11) equivalent to a cyclic code handled by the transmission unit is output from the shift register 32b. When multiplication of the reception signal RX by the cyclic code for reception R-CODE is executed by the exclusive NOR gate 33a, the reception signal is correlated with the cyclic code (that is, the reception signal is demodulated in the cyclic code). This results in reception data R-DATA. While the reception data R-DATA is not synchronized with the cyclic code for reception R-CODE, the reception data R-DATA having certain timing becomes inconsistent with reception data R-DATA, which lags behind the reception data by one cycle of the reception clock RXC, several times during one cycle of the reception clock RXC. A result of detecting the above inconsistency is output from the exclusive OR gate 42 and accumulated in the accumulator 43.

Furthermore, when the frequency of these inconsistencies in which the reception data items R-DATA become inconsistent with each other during one cycle of the reception clock RXC and which is detected by the amplitude comparing unit 44, exceeds the predetermined permissible value, the voltage level of the code synchronizing signal *SYNC output from the accumulator 43 changes from "L" (low level) to "H" (high level) transition. The clear signal CLEAR (waveform (j) in FIG. 11) is then generated, whereby the 1/N counter 24 is cleared (i.e., reset). Since the 1/N counter 24 is thus cleared in order to shift the phase of the cyclic code for reception by one cycle of the reception clock RXC, the reception data can be synchronized with the cyclic code for reception during a period corresponding to a maximum cycle N×(N−1) of the reception clock RXC.

Figure 12:
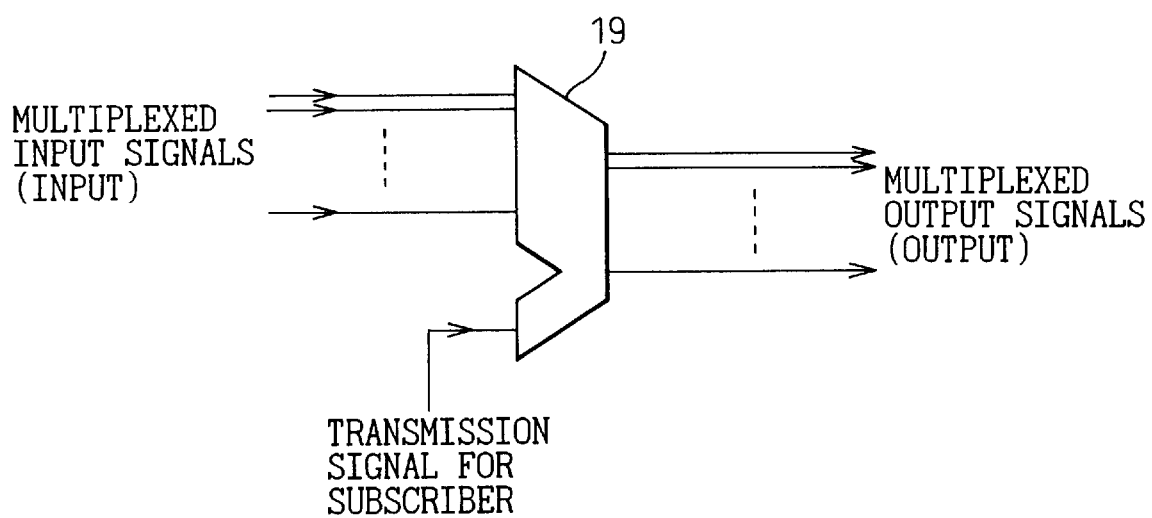
FIG. 12 is a circuit diagram showing a practical example for transmitting multiplexed signals in accordance with a typical embodiment of the present invention.
Figure 13:
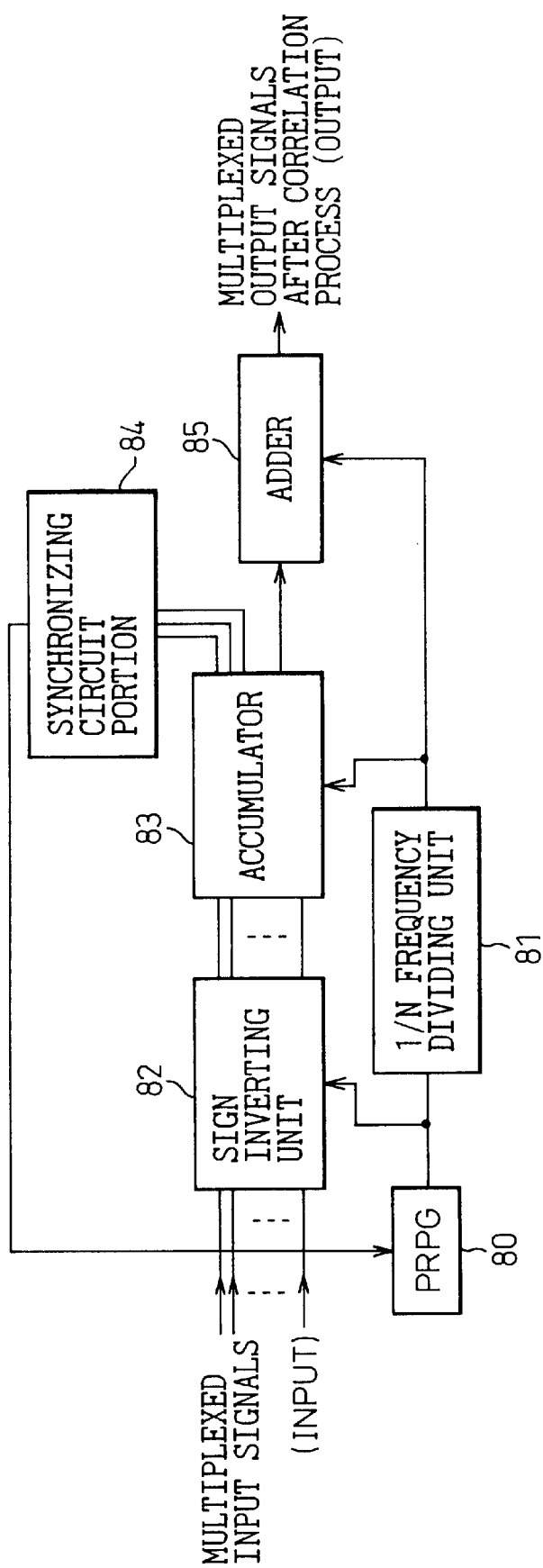
FIG. 13 is a circuit diagram showing a practical example for receiving multiplexed signals in accordance with a typical embodiment of the present invention.

FIG. 12 is a circuit diagram showing a practical example for transmitting binary coding multiplexed signals in accordance with a typical embodiment of the present invention; and FIG. 13 is a circuit diagram showing a practical example for receiving the multiplexed signals in accordance with the typical embodiment of the present invention. Shown are the main portions of a transmission unit and reception unit for transmitting and receiving a plurality of kinds of multiplexed signals, for example, signals employed in the fifth embodiment (FIG. 7) over common transmission lines.

The transmission unit shown in FIG. 12 includes an adder 19 for logically adding up multiplexed input signals INPUT (that is, an input binary coded multi-valued signal) corresponding to multiplexed data items. In this case, when the multiplexed input signals are added up by the adder 19, a transmission signal for subscribers that is a signal other than the multiplexed input signals and is a code-modulated signal or a signal modulated in a spreading code, may be included.

A range of output values can be set by adding a proper margin to a maximum value or minimum value among values output during a certain period. If a result of addition exceeds the set range, a set maximum or minimum value (positive or negative limit value) is output. A subscriber's input may be one bit long or a plurality of bits long. With regard to the above addition, an addition using a straight scale would be easy to do. To utilize more effectively communication media, a companding method that has been employed in the past would be helpful. When the compander method (i.e., compressor and expander method) is adopted for a digital line, a signal having the amplitude thereof compressed, that is, a signal produced by a compander is quantized within the range of output values and then output.

The reception unit shown in FIG. 13 includes a sign inverting unit 82 for adjusting the sign of each bit of each multiplexed input signal, which is composed of multiple bits, according to an output of the pseudo-random pulse generator 80 for generating a spreading code such as a cyclic code for reception; and an accumulator 83 for adding up multiplexed input signals during a period corresponding to one cycle of the reception clock. The accumulator 83 adds up the multiplexed input signals during a period corresponding to one cycle of the reception clock, and thus correlates the signals with the spreading code. The multiplexed input signals correlated with the spreading code are input to the adder 85 while being synchronized with the spreading code by a synchronizing circuit portion 84, on the basis of the reception clock produced by a 1/N frequency dividing unit 81. Consequently, the original multiplexed data is restored.

Figure 14:
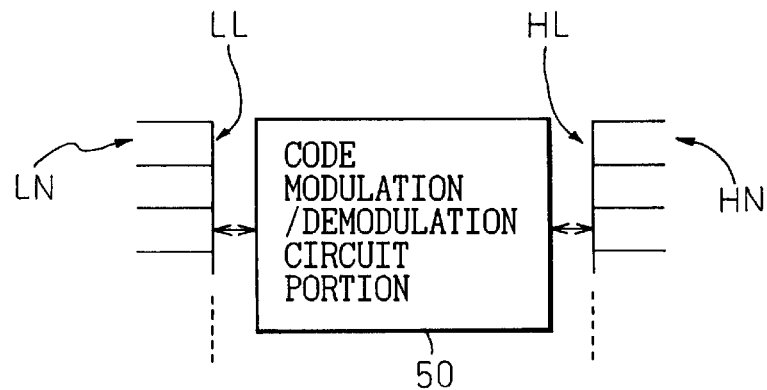
FIG. 14 is a circuit block diagram showing the configuration of the seventh preferred embodiment of the present invention.

FIG. 14 is a circuit block diagram showing the configuration in accordance with the seventh embodiment of the present invention. Shown, as an example, is the simplified configuration of a data communication system in which a plurality of kinds of code-modulated signals are converted to be transferred between links among links of a plurality of hierarchies or between a high-speed link and low-speed link.

In the seventh preferred embodiment shown in FIG. 14, a code modulation/demodulation circuit portion 50 is interposed between a low-speed network LN composed of low-speed links and a high-speed network HN composed of high-speed links. The code modulation/demodulation circuit portion 50 includes main transmission pseudo-random pulse generators (or main transmission code generators) and transmission multipliers, which are connected on the low-speed links LL and represented by those in accordance with the sixth embodiment, and further includes a reception clock extracting circuit portion, a reception pseudo-random pulse generator (or a transmission code generator), and a reception multiplier, which are connected on the high-speed links HL and represented by those in accordance with the sixth embodiment. When data items are synchronized with transmission clocks according to codes over the low-speed links, code-modulated signals are converted by the code modulation/demodulation circuit portion 50, which inputs code-modulated signals from the low-speed network LN, so that the code-modulated signals can be transferred from the low-speed network LN to the high-speed network HN. In contrast, when data items are not synchronized with the transmission clocks according to the codes over the low-speed links, after a synchronizer (not shown) for synchronizing data items with the transmission clocks according to the codes is used for synchronization, the code-modulated signals are converted.

Figure 15:
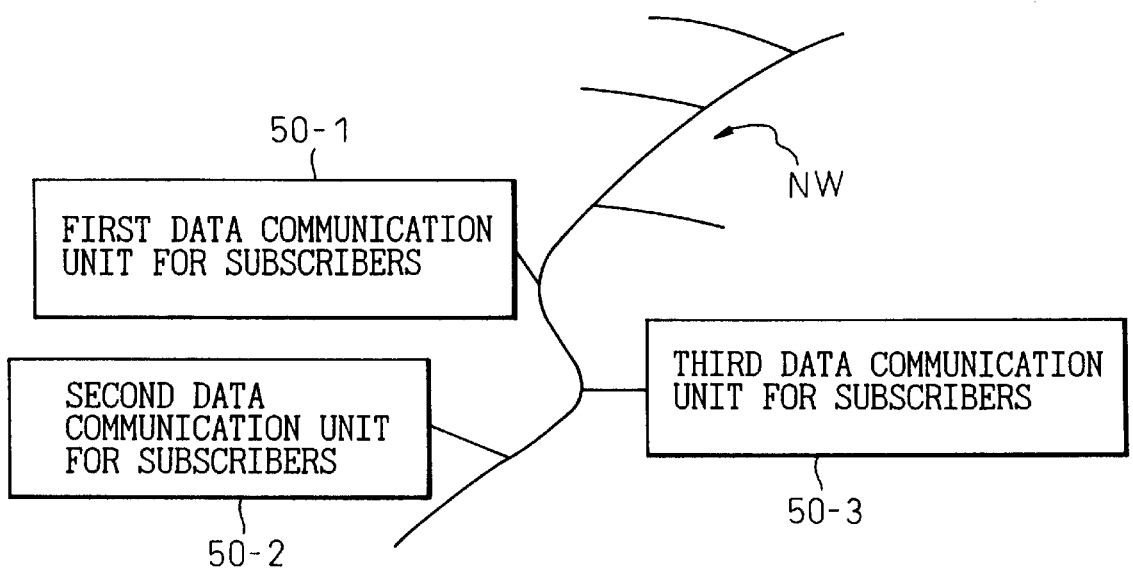
FIG. 15 is a circuit block diagram showing the configuration of the eighth preferred embodiment of the present invention.

FIG. 15 is a circuit block diagram showing a configuration in accordance with the eighth preferred embodiment of the present invention. Shown, as an example, is the simplified configuration of a data communication system in which a unique cyclic code or non-cyclic code (unique code) is assigned to each of branch points constituting one network, and the unique code is assigned to an individual subscriber at each branch point.

In the eighth preferred embodiment shown in FIG. 15, a plurality of data communication units for subscribers including first to third data communication units for subscribers 50-1 to 50-3 are installed at a plurality of branch points constituting one network NW.

The plurality of data communication units for subscribers each comprise a plurality of kinds of transmission pseudo-random pulse generators for generating a plurality of cyclic codes for transmission; a plurality of transmission multipliers for multiplying each bit of the plurality of kinds of data items by the plurality of kinds of cyclic codes for transmission; a reception clock extracting circuit portion for extracting reception clocks respectively having transmission speeds corresponding to the bit rates of bit clocks of a plurality of kinds of data items; a reception pseudo-random pulse generator for generating cyclic codes for reception, which are equivalent to the plurality of kinds of cyclic codes for transmission, on the basis of the reception clocks; a reception multiplier for multiplying a plurality of kinds of received code-modulated signals by the cyclic codes for reception so as to restore the plurality of kinds of data items; and a reception data synchronizing circuit portion for synchronizing the plurality of kinds of thus restored data items by the cyclic codes for reception. These components are represented by those in accordance with the fifth embodiment.

Furthermore, in the eighth embodiment shown in FIG. 15, the plurality of kinds of cyclic codes for transmission are assigned to the plurality of branch points, respectively. The contents and phases of the cyclic codes associated with the branch points are differentiated in advance from each other. Owing to this configuration, a unique cyclic code can be assigned to an individual subscriber.

Furthermore, the configuration in accordance with the eighth embodiment may be adapted to a data communication system, in which transmission speeds at which a plurality of kinds of transmission clocks are transmitted are higher than the bit rates of data items that are objects of transmission, and the transmission speeds are not integral multiples of the bit rates.

Furthermore, the configuration in accordance with the eighth embodiment may be adapted to a data communication system in which non-cyclic codes are substituted for the cyclic codes in order to modulate and demodulate a plurality of kinds of data items.

FIG. 16 is a circuit block diagram showing a configuration in accordance with the ninth preferred embodiment of the present invention. Shown, as an example, is the simplified configuration of a data communication system in which all or many of branch points constituting one main network and a plurality of sub networks share common codes.

In the ninth preferred embodiment shown in FIG. 16, a plurality of gateways including first to fourth gateways 52-1 to 52-4 are installed at a plurality of branch points constituting one main network MN and a plurality of sub networks (for example, first to fourth sub networks SN-1 to SN-4).

The plurality of gateways each comprise a plurality of kinds of transmission pseudo-random pulse generators for generating a plurality of kinds of cyclic codes for transmission; a plurality of kinds of transmission multipliers for multiplying each bit of a plurality of kinds of data items by the plurality of kinds of cyclic codes for transmission; a reception clock extracting circuit portion for extracting reception clocks respectively having transmission speeds corresponding to the bit rates of the bit clocks of the plurality of kinds of data items; a reception pseudo-random pulse generator for generating cyclic codes for reception, which are equivalent to the plurality of kinds of cyclic codes for transmission, on the basis of the reception clocks; a reception multiplier for multiplying the plurality of kinds of received code-modulated signals by the cyclic codes for reception so as to restore the plurality of kinds of data items; and a reception data synchronizing circuit portion for synchronizing the plurality of kinds of thus restored data items with the cyclic codes for reception.

Furthermore, in the ninth embodiment shown in FIG. 16, common cyclic codes that enable to pass through all or many of the plurality of branch points, are assigned. According to the ninth embodiment, therefore, code-modulated signals or signals modulated in the common cyclic codes can be received concurrently. This does not always mean that unconditional broadcast can be achieved, but means that addresses or the like contained in data items modulated in the common codes can be identified independently of each other in order to receive the data items selectively.

Furthermore, the configuration in accordance with the ninth embodiment can be adapted to a data communication system in which transmission speeds at which a plurality of kinds of transmission clocks are transmitted are higher than the bit rates of the bit clocks of the data items that are objects of transmission, and the transmission speeds are not integral multiples of the bit rates.

Furthermore, the configuration in accordance with the ninth embodiment can be adapted to a data communication system in which non-cyclic codes are substituted for the cyclic codes in order to modulate and demodulate a plurality of kinds of data items.

FIG. 17 is a circuit block diagram showing a configuration in accordance with the tenth preferred embodiment of the present invention. Shown as an example is the simplified configuration of a data communication system, in which a hub station that is a central control unit or a transmission source transmits an intended address, and a data communication unit for subscribers (for example, a station) whose address agrees with the intended address establishes modulation codes at a branch point, and thus the necessity of high-speed ATM exchanges is obviated.

In the tenth preferred embodiment shown in FIG. 17, a plurality of data communication units for subscribers including first and second data communication units for subscribers 56-1 and 56-2, which are connected to a plurality of branch points constituting one network and used by subscribers to mutually transmit and receive a plurality of kinds of data items, and one central control unit such as a hub station 9 for controlling the plurality of data communication units, are installed. Furthermore, a plurality of gateways including first and second gateways 54-1 and 54-2 are installed at the plurality of branch points. The plurality of data communication units for subscribers have substantially the same configuration as the data communication units for subscribers employed in the eighth embodiment, and the plurality of gateways have substantially the same configuration as the plurality of gateways employed in the ninth embodiment.

Furthermore, a plurality of middle-speed links ML and high-speed links HL, over which data is transmitted at relatively high speeds, are linked to the central control unit in the tenth embodiment shown in FIG. 17 in such a manner that the links branch out from the central control unit. A plurality of links of other hierarchies, for example, low-speed links branch out from each of the middle-speed links ML and high-speed links HL. The plurality of data communication units for subscribers are usually connected on the low-speed links LL.

Furthermore, in the tenth embodiment shown in FIG. 17, a plurality of cyclic codes for transmission are assigned to the plurality of branch points respectively for data transmission at relatively high speed, and the contents and phases of the cyclic codes associated with the branch points are differentiated in advance from each other. An intended address sent from the central control unit is reported to the plurality of branch points. A data communication unit connected to a branch point to which cyclic codes indicating an address agreeing with the address are assigned transmits and receives the data.

In the tenth embodiment, when data is transferred from the middle-speed links ML to low-speed links LL, an intended address is sent from the central control unit. A data communication unit for subscribers whose address agrees with the sent address establishes modulation codes at a branch point. Thus, although ATM exchanges having complex circuitry are not installed, data can be readily transmitted and received between links of different hierarchies.

Preferably, according to the tenth embodiment, the plurality of branch points are each provided with several candidates for the cyclic codes in advance, and a data communication unit for subscribers selects given cyclic codes.

More preferably, according to the tenth embodiment, a part or all of the plurality of kinds of cyclic codes for transmission are transmitted from the central control unit.

More preferably, according to the tenth embodiment of the present invention, transmission lines linking the plurality of data communication units for subscribers and the central control unit are formed with double lines.

More preferably, according to the tenth embodiment of the present invention, all or some of the transmission lines formed with double lines are designed so that data can be transmitted bidirectionally.

More preferably, according to the tenth embodiment of the present invention, when data is communicated in a form in which data is transmitted at low speed, cyclic codes each having a long bit string are employed. When data is communicated in a form in which data is transmitted at high speed, cyclic codes each having a short bit string are employed.

More preferably, according to the tenth embodiment of the present invention, the minimum value of a Hamming distance between a cyclic code having a short bit string and a code which is a part of a cyclic code having a long bit string, of which a pattern of bits is inconsistent with that of the cyclic code having a short bit string, and of which the length is equal to the length of the cyclic code having the short bit string, can be made large.

More preferably, according to the tenth embodiment of the present invention, when cyclic codes assigned to the same hierarchical level of a network are arbitrated, a data communication unit for subscribers reports currently used cyclic codes or the identification numbers of the cyclic codes to all the other data communication units for subscribers within the network.

More preferably, according to the tenth embodiment of the present invention, when cyclic codes assigned to the same hierarchical level of a network are arbitrated, a data communication unit for subscribers reports currently used cyclic codes or the identification numbers of the cyclic codes to all the other data communication units for subscribers within the network, and successively reports cyclic codes scheduled to be used later or the identification numbers of the cyclic codes to all the other data communication units for subscribers. When all the other data communication units for subscribers acknowledge the cyclic does, the data communication unit for subscribers starts transmitting data.

More preferably, according to the tenth embodiment of the present invention, when a data communication unit for subscribers determines cyclic codes to be used, the data communication unit for subscribers permits any other data communication unit using cyclic codes assigned to another hierarchical level to give an instruction or select cyclic codes.

More preferably, according to the tenth embodiment of the present invention, a plurality of kinds of transmission clocks are synchronized with each other in order to multiplex a plurality of kinds of code-modulated signals.

More preferably, according to the tenth embodiment of the present invention, when the lengths of all cyclic codes are the same or the lengths of cyclic codes which is to be used are submultiples of a given value, clocks whose pulse rates determine the bit rates of data items are synchronized with each other or phases of the clocks are shifted from each other in units of cycles of transmission clocks.

More preferably, according to the tenth embodiment of the present invention, neither bit clocks whose pulse rates determine the bit rates of the bit clocks of data items nor a plurality of kinds of transmission clocks are synchronized with each other, but a plurality of kinds of code-modulated signals are multiplexed.

More preferably, according to the tenth embodiment of the present invention, as mentioned previously, in a data communication system adopting the CDMA system in which a high-frequency carrier is not used, when a bit of given data collides with other data, that is, when marks sent concurrently from two or more than two stations of the same hierarchical level coincide with each other during a period in which one bit is expressed or a portion of one bit is expressed, clipping is carried out according to multi-valued data present on a transmission line.

More preferably, according to the tenth embodiment of the present invention, collision information concerning the above collision data is detected during data transmission, and transmitted separately. If necessary, the collision information is used during data reception. Herein, "transmitted separately" means that the collision information is literally transmitted over an additional communication channel or the collision information is transmitted in a time-sharing form, that is, after the collision information is appended to data which is being transmitted, when a line becomes available, the collision information is transmitted.

More preferably, according to the tenth embodiment of the present invention, the collision information is decoded, together with originally received data in order to improve the reliability of data communication.

More preferably, according to the tenth embodiment of the present invention, the collision information is decoded, together with information concerning the collided data at the collided side at a branch point that is a junction between a low-speed link and a high-speed link. This makes it possible to report the collision information as information indicating that collision has not occurred.

More preferably, according to the tenth embodiment of the present invention, the present invention can apply to a data communication system in which transmission speeds, in which a plurality of kinds of transmission clocks are higher than bit rates of bit clocks of data items that are objects of transmission, and the transmission speeds are not integral multiples of the bit rates.

More preferably, according to the tenth embodiment of the present invention, the present invention can apply to a data communication system in which non-cyclic codes are substituted for the cyclic codes in order to modulate and demodulate data.

As mentioned above, according to some typical embodiments of the present invention, first, data communications to be performed within a network can be managed on a centralized basis by modulating data using a modulation code such as a spreading code produced, on the basis of a transmission clock having a transmission speed higher equal to or than the bit rate of the bit clock of the data that is an object of transmission. ATM exchanges each requiring complex control for a plurality of ATM switches need not be installed. Despite circuitry simpler than conventional circuitry, it is easy to adjust the length of a packet containing data, depending on whether a network is designed for high-speed communication or low-speed communication or to change the length of a packet containing data in response to a change request for changing a data communication speed.

Furthermore, in a data communication system according to some typical embodiments of the present invention, second, a cyclic code for transmission that has a frequency band thereof spread and is composed of pseudo-random pulses is produced on the basis of a transmission clock having a transmission speed that is an integral multiple of the bit rate of the bit clock of data that is an object of transmission. The data is modulated using the cyclic code according to the CDMA system, whereby the bandwidth occupied by the data is set freely. This makes it possible to manage data communications to be performed within a network on a centralized basis. Despite simple circuitry in which known ATM exchanges are unnecessary, it is easy to adjust the length of a packet containing data, depending on whether a network is designed for high-speed communication or low-speed communication or to change the length of a packet containing data in response to a change request concerning a data communication speed.

Furthermore, in a data communication system according to some typical embodiments of the present invention, third, a cyclic code for transmission that has a frequency band thereof spread and is composed of pseudo-random pulses is produced on the basis of a transmission clock having a transmission speed equal to or higher than the bit rate of data that is an object of transmission but not an integral multiple of the bit rate. The data is modulated using the cyclic code according to the CDMA system, whereby the bandwidth occupied by the data is set freely. This makes it possible to manage data communications to be performed within a network on a centralized basis. Despite simple circuitry in which known ATM exchanges are unnecessary, it is easy to adjust the length of a packet containing data, depending on whether a network is designed for high-speed communication or low-speed communication or to change the length of a packet containing data in response to a change request concerning a data communication speed.

Furthermore, in a data communication system according to some typical embodiments of the present invention, fourth, a cyclic code for transmission that has a frequency band thereof spread and is composed of pseudo-random pulses is produced on the basis of a transmission clock having a transmission speed equal to or higher than the bit rate of the bit clock of data that is an object of transmission but is not an integral multiple of the bit rate. Using the cyclic code, the data is modulated according to the CDMA system in which multiplexed data items are varied at intervals of a period shorter than one cycle of the cyclic code. The bandwidth occupied by the data is thus set freely. Consequently, data communications to be performed within the network can be managed on a centralized basis with efficiency in data communication improved relatively. Despite simple circuitry in which known ATM exchanges are unnecessary, it is easy to adjust the lengths of packets containing multiplexed data items, depending on whether a network is designed for high-speed communication or low-speed communication or to change the lengths of the packets in response to a change request concerning a data communication speed.

Furthermore, in a data communication system according to some typical embodiments of the present invention, fifth, a non-cyclic code for transmission that has a frequency band thereof spread and is composed of pseudo-random pulses is produced on the basis of a transmission clock having a transmission speed that is an integral multiple of the bit rate of the bit clock of data that is an object of transmission. The data is modulated using the non-cyclic code according to the CDMA system, whereby the bandwidth occupied by the data is set freely. Even when the non-cyclic code is employed, data communications to be performed within a network can be managed on a centralized basis. Despite simple circuitry in which known ATM exchanges are unnecessary, it is easy to adjust the length of a packet containing data, depending on whether a network is designed for high-speed communication or low-speed communication or to change the length of the packet in response to a change request concerning a data communication speed.

Furthermore, in a data communication system according to some typical embodiments of the present invention, sixth, a plurality of kinds of cyclic codes for transmission, each of which has a frequency band thereof spread and is composed of pseudo-random pulses, are produced on the basis of a plurality of kinds of transmission clocks respectively having transmission speeds that are integral multiples of a plurality of kinds of bit rates of bit clocks of a plurality of kinds of data items that are objects of transmission. When the data items are modulated using the plurality of kinds of cyclic codes according to the CDMA system, neither a plurality of kinds of bit clocks whose pulse rates determine the plurality of kinds of bit rates nor the plurality of kinds of transmission clocks are synchronized with each other but a plurality of kinds of code-modulated signals are multiplexed and transmitted. Despite simple circuitry in which known ATM exchanges are unnecessary, various data items ranging from data which is to be communicated at high speed through data which is to be communicated at low speed can be transmitted smoothly.

Furthermore, in a data communication system according to some typical embodiments of the present invention, seventh, a plurality of kinds of transmission clocks each of which has a frequency band thereof spread and is composed of pseudo-random pulses are produced on the basis of a plurality of kinds of transmission clocks respectively having transmission speeds that are integral multiples of a plurality of kinds of bit rates of a plurality of kinds of data items that are objects of transmission. When the data items are modulated using the plurality of kinds of cyclic codes according to the CDMA system, each clock in at least one of a plurality of kinds of clocks whose pulse rates determine the plurality of kinds of bit rates and the plurality of kinds of transmission clocks is shifted by a given value relative to the other clock. Thus, a plurality of kinds of code-modulated signals are multiplexed and transmitted. Despite simple circuitry in which known ATM exchanges are unnecessary, various data items ranging from data which is to be communicated at high speed through data which is to be communicated at low speed can be received without an error.

Furthermore, in a data communication system according to some typical embodiments of the present invention, eighth, a plurality of kinds of code-modulated signals can be transmitted from transmission pseudo-random pulse generators and transmission multipliers belonging to one hierarchy of a network composed of a plurality of hierarchies to a reception clock extracting circuit portion, reception pseudo-random pulse generator, and reception multiplier belonging to another hierarchy of the network. Despite simple circuitry in which known ATM exchanges are unnecessary, it is easy to convert packets containing code-modulated signals so that the packets can be transferred from a network designed for high-speed communication to a network designed for low-speed network.

Furthermore, in a data communication system according to some typical embodiments of the present invention, ninth, at a plurality of branch points constituting a network, a plurality of kinds of cyclic codes for transmission each of which has a frequency band thereof spread and is composed of pseudo-random pulses are produced on the basis of a plurality of kinds of transmission clocks respectively having transmission at speeds that are integral multiples of a plurality of kinds of bit rates of bit clocks of a plurality of kinds of data items that are objects of transmission. When the data items are modulated using the plurality of kinds of cyclic codes according to the CDMA system, the plurality of kinds of cyclic codes for transmission are assigned to the plurality of branch points, respectively, and the contents and phases of the cyclic codes associated with the branch points are mutually differentiated in advance. Despite simple circuitry in which known ATM exchanges are unnecessary, packets containing code-modulated signals can be converted readily at any of the branch points.

Furthermore, in a data communication system according to some typical embodiments of the present invention, tenth, at a plurality of branch points constituting a network, a plurality of kinds of cyclic codes each of which has a frequency band thereof spread and is composed of pseudo-random pulses are produced on the basis of a plurality of kinds of transmission clocks respectively having transmission speeds that are integral multiples of a plurality of kinds of bit rates of a plurality of kinds of data items that are objects of transmission. When the data items are modulated and demodulated using the plurality of kinds of cyclic codes according to the CDMA system, common cyclic codes for enabling pass-through of all or many of the plurality of branch points, are assigned. Despite simple circuitry in which known ATM exchanges are unnecessary, various data items ranging from data which is to be communicated at high speed through data which is to be communicated at low speed can be modulated and demodulated quickly without an error.

Furthermore, in a data communication system according to some typical embodiments of the present invention, eleventh, in a network in which a plurality of data communication units connected to a plurality of branch points are controlled by one central control unit, the data communication units each produce a plurality of kinds of cyclic codes for transmission on the basis of a plurality of kinds of transmission clocks respectively having transmission speeds that are integral multiples of a plurality of kinds of bit rates of bit clocks of a plurality of kinds of data items that are objects of transmission. When the data items are modulated and demodulated using the cyclic codes according to the CDMA system, an intended address is sent from the central control unit to the plurality of branch points. A data communication unit whose address agrees with the intended address transmits and receives data. Modulation codes such as the cyclic codes can be changed appropriately or even in the course of communication. By changing the length of a code, a communication speed can be changed. Communication requests issued from various communication equipment can be coped with flexibly.

In this case, when a short modulation code is defined so as not to become analogous to a part of a long modulation code which is to be communicated concurrently, data transmission and reception can be synchronized with each other shortly. The synchronism can be maintained reliably. Moreover, in this case, an encryption code that cannot be deciphered easily may be used as the modulation code.

What is claimed is:

1. A data communication system, comprising:
   a code modulator generating a first modulation code on the basis of a transmission clock, which has a transmission speed higher than a bit rate of a bit clock of data that is an object of transmission, and multiplying each bit of the data by said first modulation code so as to generate a code-modulated signal;
   a clock extracting unit receiving a code-modulated signal sent from said code modulator and extracting a reception clock, which has a transmission speed corresponding to the bit rate of said bit clock, from the received code-modulated signal; and
   a code demodulator generating a second modulation code equivalent to said first modulation code on the basis of said reception clock extracted by said clock extracting unit, and multiplying the received code-modulated signal by said second modulation code so as to restore the data.

2. A data communication system according to claim 1, wherein said code modulator means includes a first spreading code generating unit generating a first spreading code which has a frequency band thereof spread, as said first modulation code on the basis of said transmission clock, and a first multiplying unit for multiplying each bit of the data by said first spreading code so as to spread a frequency spectrum of the data.

3. A data communication system according to claim 1, wherein said code demodulator includes a second spreading code generating unit generating a second spreading code equivalent to said first spreading code, as said second modulation code on the basis of said reception clock extracted by said clock extracting unit, and a second multiplying unit multiplying the received code-modulated signal by said second spreading code so as to restore the data.

4. A data communication system according to claim 1, further comprising a reception data synchronizing unit synchronizing data restored by said code demodulating means with said second modulation code and outputting reception data that is synchronized with the data.

5. A data communication system, comprising:
   a transmission pseudo-random pulse generator generating a cyclic code for transmission, which has a spread frequency band and is composed of pseudo-random pulses, on the basis of a transmission clock having a transmission speed that is an integral multiple of a bit rate of a bit clock of data that is an object of transmission;
   a transmission multiplier multiplying each bit of the data by said cyclic code for transmission so as to generate a code-modulated signal;
   a reception clock extracting circuit receiving said code-modulated signal and extracting a reception clock, which has a transmission speed corresponding to the bit rate of said bit clock, from the received code-modulated signal;
   a reception pseudo-random pulse generator generating a cyclic code for reception, which is equivalent to said cyclic code for transmission and composed of pseudo-random pulses, on the basis of said reception clock extracted by said reception clock extracting circuit portion; and
   a reception multiplier multiplying the received code-modulated signal by the cyclic code for reception so as to restore the data.

6. A data communication system according to claim 5, further comprising a reception data synchronizing circuit synchronizing the restored data with said cyclic code for reception and outputting reception data that is synchronized with the data on the basis of code.

7. A data communication system, comprising:
   a transmission pseudo-random pulse generator generating a cyclic code for transmission, which has a spread frequency band and is composed of pseudo-random pulses, on the basis of a transmission clock having a transmission speed higher than a bit rate of a bit clock of data that is an object of transmission;
   a transmission multiplier multiplying each bit of the data by said cyclic code for transmission so as to generate a code-modulated signal;
   a reception clock extracting circuit portion receiving said code-modulated signal and extracting a reception clock, which has a transmission speed corresponding to the bit rate of said bit clock, from the received code-modulated signal;

a reception pseudo-random pulse generator generating a cyclic code for reception, which is equivalent to said cyclic code for transmission and composed of pseudo-random pulses, on the basis of said reception clock extracted by said reception clock extracting circuit portion; and a reception multiplier multiplying the received code-modulated signal by said cyclic code for reception so as to restore the data.

8. A data communication system according to claim 7, further comprising a reception data synchronizing circuit synchronizing the restored data with said cyclic code for reception and outputting reception data that is synchronized with the data.

9. A data communication system, comprising:

a transmission pseudo-random pulse generator generating a cyclic code for transmission, which has a spread frequency band and is composed of pseudo-random pulses, on the basis of a transmission clock having a transmission speed higher than a bit rate of data that is an object of transmission;

a transmission multiplier multiplying the data by said cyclic code for transmission in units of a plurality of bits so as to generate a code-modulated signal;

a reception clock extracting circuit receiving said code-modulated signal and extracting a reception clock, which has a transmission speed corresponding to the bit rate of said bit clock, from the received code-modulated signal;

a reception pseudo-random pulse generator generating a cyclic code for reception, which is equivalent to said cyclic code for transmission and composed of pseudo-random pulses, on the basis of said reception clock extracted by said reception clock extracting circuit portion; and a reception multiplier multiplying the received code-modulated signal by said cyclic code for reception so as to restore the data.

10. A data communication system according to claim 9, further comprising a reception data synchronizing circuit portion synchronizing the restored data with said cyclic code for reception and outputting reception data that is synchronized with the data.

11. A data communication system, comprising:

a transmission code generator generating a non-cyclic code for transmission, which has a spread frequency band, on the basis of a transmission clock having a transmission speed that is an integral multiple of a bit rate of a bit clock of data that is an object of transmission;

a transmission multiplier for multiplying each bit of the data by said non-cyclic code for transmission so as to generate a code-modulated signal;

a reception clock extracting circuit portion for receiving the code-modulated signal and extracting a reception clock, which has a transmission speed corresponding to the bit rate of said bit clock, from the received code-modulated signal;

a reception code generator for generating a non-cyclic code for reception, which is equivalent to said non-cyclic code for transmission, on the basis of said reception clock extracted by said reception clock extracting circuit portion; and a reception multiplier for multiplying the received code-modulated signal by said non-cyclic code for reception so as to restore the data.

12. A data communication system according to claim 11, further comprising a reception data synchronizing circuit portion for synchronizing the restored data with said non-cyclic code for reception and outputting reception data that is synchronized with the data on the basis of code.

13. A data communication system, comprising:

a transmission code generator generating a non-cyclic code for transmission, which has a spread frequency band, on the basis of a transmission having a transmission speed higher than a bit rate of a bit clock of data that is an object of transmission;

a transmission multiplier multiplying the data by said non-cyclic code in units of a plurality of bits so as to generate a code-modulated signal;

a reception clock extracting circuit portion receiving said code-modulated signal and extracting a reception clock, which has a transmission speed corresponding to the bit rate of said bit clock, from the received code-modulated signal;

a reception code generator generating a non-cyclic code for reception, which is equivalent to said cyclic code for transmission, on the basis of said reception clock extracted by said reception clock extracting circuit portion; and a reception multiplier multiplying the received code-modulated signal by said non-cyclic code for reception so as to restore the data.

14. A data communication system according to claim 13, further comprising a reception data synchronizing circuit synchronizing the restored data with said non-cyclic code for reception and outputting reception data that is synchronized with the data.

15. A data communication system, comprising:

a plurality of kinds of transmission pseudo-random pulse generators generating a plurality of kinds of cyclic codes for transmission, each of which has a spread frequency band and is composed of pseudo-random pulses, on the basis of a plurality of kinds of transmission clocks respectively having transmission speeds that are integral multiples of a plurality of kinds of bit rates of bit clocks of a plurality of kinds of data items that are objects of transmission;

a plurality of kinds of transmission multipliers multiplying each bit of said plurality of kinds of data items by said plurality of kinds of cyclic codes for transmission so as to generate a plurality of kinds of code-modulated signals;

a reception clock extracting circuit portion receiving the plurality of kinds of code-modulated signals and extracting reception clocks, which have transmission speeds corresponding to said plurality of kinds of bit rates, respectively, from the plurality of kinds of received code-modulated signals;

a reception pseudo-random pulse generator producing cyclic codes for reception, which are equivalent to said plurality of kinds of cyclic codes for transmission and are each composed of pseudo-random pulses, on the basis of said reception clocks extracted by said reception clock extracting circuit portion; and a reception multiplier multiplying the plurality of kinds of received code-modulated signals by said cyclic codes for reception so as to restore said plurality of kinds of data items;

wherein neither a plurality of kinds of the bit clocks whose pulse rates determine said plurality of kinds of bit rates nor said plurality of kinds of transmission clocks are synchronized with each other, and the plurality of kinds of code-modulated signals are multiplexed and transmitted.

16. A data communication system according to claim 15, further comprising a reception data synchronizing circuit portion synchronizing said plurality of kinds of restored data items with said cyclic codes for reception and outputting reception data items that are synchronized with said plurality of kinds of data items on the basis of codes.

17. A data communication system according to claim 15, wherein said plurality of kinds of code-modulated signals are transmitted from said transmission pseudo-random pulse generators and said transmission multipliers, which belong to any one hierarchy of a network composed of a plurality of hierarchies, to said reception clock extracting circuit portion, said reception pseudo-random pulse generator, and said reception multiplier, which belong to another hierarchy of said network.

18. A data communication system, comprising:
a plurality of kinds of transmission pseudo-random pulse generators generating a plurality of cyclic codes for transmission, each of which has a spread frequency band and is composed of pseudo-random pulses, on the basis of a plurality of kinds of transmission clocks respectively having transmission speeds higher than a plurality of kinds of bit rates of bit clocks of a plurality of kinds of data items that are objects of transmission;
a plurality of kinds of transmission multipliers multiplying each bit of said plurality of kinds of data items by said cyclic codes for transmission so as to generate a plurality of kinds of code-modulated signals;
a reception clock extracting circuit portion receiving said plurality of kinds of code-modulated signals and extracting reception clocks, which have transmission speeds corresponding to the plurality of kinds of bit rates, respectively, from the plurality of kinds of received code-modulated signals;
a reception pseudo-random pulse generator generating cyclic codes for reception, which are equivalent to said plurality of kinds of cyclic codes for transmission and are each composed of pseudo-random pulses, on the basis of said reception clocks extracted by said reception clock extracting circuit portion; and
a reception multiplier multiplying the plurality of kinds of received code-modulated signals by the cyclic codes for reception so as to restore said plurality of kinds of data items;
wherein neither a plurality of kinds of the bit clocks whose pulse rates determine said plurality of kinds of bit rates nor said plurality of kinds of transmission clocks are synchronized with each other, and said plurality of kinds of code-modulated signals are multiplexed and transmitted.

19. A data communication system according to claim 18, further comprising a reception data synchronizing circuit portion synchronizing said plurality of kinds of restored data items by said cyclic codes for reception and outputting reception data items that are synchronized with said plurality of kinds of data items on the basis of codes.

20. A data communication system according to claim 18, wherein said plurality of kinds of code-modulated signals are transmitted from said transmission pseudo-random pulse generators and said transmission multipliers, which belong to any one hierarchy of a network composed of a plurality of hierarchies, to said reception clock extracting circuit portion, said reception pseudo-random pulse generator, and said reception multiplier, which belong to another hierarchy of said network.

21. A data communication system, comprising:
a plurality of kinds of transmission code generators generating a plurality of kinds of non-cyclic codes for transmission, each of which has a spread frequency band, on the basis of a plurality of kinds of transmission clocks respectively having transmission speeds higher than a plurality of kinds of bit rates of bit clocks of a plurality of kinds of data items that are objects of transmission;
a plurality of kinds of transmission multipliers multiplying each bit of said plurality of kinds of data items by the non-cyclic codes for transmission so as to generate a plurality of kinds of code-modulated signals;
a reception clock extracting circuit portion receiving said plurality of kinds of code-modulated signals and extracting reception clocks, which have transmission speeds corresponding to said plurality of kinds of bit rates, respectively, from the plurality of kinds of received code-modulated signals;
a reception code generator generating non-cyclic codes for reception, which are equivalent to said plurality of kinds of non-cyclic codes for transmission, on the basis of said reception clocks extracted by said reception clock extracting circuit portion; and
a reception multiplier multiplying the plurality of kinds of received code-modulated signals by said non-cyclic codes for reception so as to restore said plurality of kinds of data items;
wherein neither a plurality of kinds of the bit clocks whose pulse rates determine said plurality of kinds of bit rates nor said plurality of kinds of transmission clocks are synchronized with each other, and said plurality of kinds of code-modulated signals are multiplexed and transmitted.

22. A data communication system according to claim 21, further comprising a reception data synchronizing circuit portion synchronizing the plurality of kinds of restored data items with said non-cyclic codes for reception and outputting reception data items that are synchronized with said plurality of kinds of data items on the basis of codes.

23. A data communication system according to claim 21, wherein said plurality of kinds of code-modulated signals are transmitted from said transmission code generators and said transmission multipliers, which belong to any one hierarchy of a network composed of a plurality of hierarchies, to said reception clock extracting circuit portion, said reception code generator, and said reception multiplier, which belong to another hierarchy of said network.

24. A data communication system, comprising:
a plurality of kinds of transmission pseudo-random pulse generators for generating a plurality of kinds of cyclic codes for transmission, each of which has a frequency band thereof spread and is composed of pseudo-random pulses, on the basis of a plurality of kinds of transmission clocks respectively having transmission speeds that are integral multiples of a plurality of kinds of bit rates of bit clocks of a plurality of kinds of data items that are objects of transmission;
a plurality of kinds of transmission multipliers for multiplying each bit of said plurality of kinds of data items by said cyclic codes for transmission so as to generate a plurality of kinds of code-modulated signals;

a reception clock extracting circuit portion for receiving said plurality of kinds of code-modulated signals and extracting reception clocks, which have transmission speeds corresponding to said plurality of kinds of bit rates, respectively, from the plurality of kinds of received code-modulated signals;

a reception pseudo-random pulse generator for generating cyclic codes for reception, which are equivalent to said plurality of kinds of cyclic codes for transmission and are each composed of pseudo-random pulses, on the basis of said reception clocks extracted by said reception clock extracting circuit portion; and a reception multiplier for multiplying the plurality of kinds of received code-modulated signals by said cyclic codes for reception so as to restore said plurality of kinds of data items;

wherein each clock in at least one of a plurality of kinds of bit clocks whose pulse rates determine said plurality of kinds of bit rates, and said plurality of kinds of transmission clocks is shifted by a given value relative to any other clock, and said plurality of kinds of code-modulated signals are multiplexed and transmitted.

25. A data communication system according to claim 24, further comprising a reception data synchronizing circuit portion synchronizing the plurality of kinds of restored data items with said cyclic codes for reception and outputting reception data items that are synchronized with said plurality of kinds of data items on the basis of codes.

26. A data communication system according to claim 24, wherein said plurality of kinds of code-modulated signals are transmitted from said transmission pseudo-random pulse generators and said transmission multipliers, which belong to any one hierarchy of a network composed of a plurality of hierarchies, to said reception clock extracting circuit portion, said reception pseudo-random pulse generator, and said reception multiplier, which belong to another hierarchy of said network.

27. A data communication system, comprising:

a plurality of kinds of transmission pseudo-random pulse generators for generating a plurality of kinds of cyclic codes for transmission, each of which has a frequency band thereof spread and is composed of pseudo-random pulses, on the basis of a plurality of kinds of transmission clocks respectively having transmission speeds higher than a plurality of kinds of bit rates of bit clocks of a plurality of kinds of data items that are objects of transmission;

a plurality of kinds of transmission multipliers for multiplying each bit of said plurality of kinds of data items by said cyclic codes for transmission so as to generate a plurality of kinds of code-modulated signals;

a reception clock extracting circuit portion for receiving said plurality of kinds of code-modulated signals and extracting reception clocks, which have transmission speeds corresponding to said plurality of kinds of bit rates, respectively, from the plurality of kinds of received code-modulated signals;

a reception pseudo-random pulse generator for generating cyclic codes for reception, which are equivalent to said plurality of kinds of cyclic codes for transmission and are each composed of pseudo-random pulses, on the basis of said reception clocks extracted by said reception clock extracting circuit portion; and a reception multiplier for multiplying the plurality of kinds of received code-modulated signals by said cyclic codes for reception so as to restore said plurality of kinds of data items;

wherein each clock in at least one of a plurality of kinds of the bit clocks whose pulse rates determine said plurality of kinds of bit rates, and said plurality of kinds of transmission clock, is shifted by a given value relative to any other clock, and said plurality of kinds of code-modulated signals are multiplexed and transmitted.

28. A data communication system according to claim 27, further comprising a reception data synchronizing circuit portion synchronizing the plurality of kinds of restored data items with said cyclic codes for reception and outputting reception data items that are synchronized with said plurality of kinds of data items on the basis of codes.

29. A data communication system according to claim 27, wherein said plurality of kinds of code-modulated signals are transmitted from said transmission pseudo-random pulse generators and said transmission multipliers, which belong to any one hierarchy of a network composed of a plurality of hierarchies, to said reception clock extracting circuit portion, said reception pseudo-random pulse generator, and said reception multiplier, which belong to another hierarchy of said network.

30. A data communication system, comprising:

a plurality of kinds of transmission code generators generating a plurality of kinds of non-cyclic codes for transmission, each of which has a spread frequency band, on the basis of a plurality of kinds of transmission clocks respectively having transmission speeds higher than a plurality of kinds of bit rates of bit clocks of a plurality of kinds of data items that are objects of transmission;

a plurality of kinds of transmission multipliers multiplying each bit of said plurality of kinds of data items by the plurality of kinds of non-cyclic codes for transmission so as to generate a plurality of kinds of code-modulated signals;

a reception clock extracting circuit portion receiving said plurality of kinds of code-modulated signals and extracting reception clocks, which have transmission speeds corresponding to said plurality of kinds of bit rates, respectively, from the plurality of kinds of received code-modulated signals;

a reception code generator generating non-cyclic codes for reception, which are equivalent to said plurality of kinds of non-cyclic codes for transmission, on the basis of said reception clocks extracted by said reception clock extracting circuit portion; and a reception multiplier multiplying the plurality of kinds of received code-modulated signals by the non-cyclic codes for reception so as to restore said plurality of kinds of data items;

wherein each clock in at least one of a plurality of kinds of the bit clocks whose pulse rates determine said plurality of kinds of bit rates, and the plurality of kinds of transmission clocks is dephased by a given value relative to the other one, and the plurality of kinds of code-modulated signals are multiplexed and transmitted.

31. A data communication system according to claim 30, further comprising a reception data synchronizing circuit portion synchronizing the restored data items with said non-cyclic codes for reception and outputting reception data items that are synchronized with the data items on the basis of codes.

32. A data communication system according to claim 30, wherein said plurality of kinds of code-modulated signals are transmitted from said transmission code generators and said transmission multipliers, which belong to any one hierarchy of a network composed of a plurality of hierarchies, to said reception clock extracting circuit portion, said reception code generator, and said reception multiplier, which belong to another hierarchy of said network.

33. A data communication system, comprising at a plurality of branch points constituting a network:
- a plurality of kinds of transmission pseudo-random pulse generators generating a plurality of kinds of cyclic codes for transmission, each of which has a spread frequency band and is composed of pseudo-random pulses, on the basis of a plurality of kinds of transmission clocks respectively having transmission speeds that are integral multiples of a plurality of kinds of bit rates of bit clocks of a plurality of kinds of data items that are objects of transmission;
- a plurality of kinds of transmission multipliers multiplying each bit of said plurality of kinds of data items by said plurality of kinds of cyclic codes for transmission so as to generate a plurality of, kinds of code-modulated signals;
- a reception clock extracting circuit portion receiving said plurality of kinds of code-modulated signals and extracting reception clocks, which have transmission speeds corresponding to said plurality of kinds of bit rates, respectively, from the plurality of kinds of received code-modulated signals;
- a reception pseudo-random pulse generator generating cyclic codes for reception, which are equivalent to said plurality of kinds of cyclic codes for transmission and are each composed of pseudo-random pulses, on the basis of said reception clocks extracted by said reception clock extracting circuit portion; and
- a reception multiplier multiplying the plurality of kinds of received code-modulated signals by said cyclic codes for reception so as to restore said plurality of kinds of data items,
- wherein said plurality of kinds of cyclic codes for transmission are assigned to said plurality of branch points, respectively, and the contents and phases of said cyclic codes associated with said branch points are differentiated in advance from each other.

34. A data communication system according to claim 33, further comprising a reception data synchronizing circuit portion synchronizing the plurality of kinds of restored data items with said cyclic codes for reception and outputting reception data items that are synchronized with said plurality of kinds of data items on the basis of codes.

35. A data communication system, comprising at a plurality of branch points constituting a network:
- a plurality of kinds of transmission pseudo-random pulse generators generating a plurality of kinds of cyclic codes for transmission, each of which has a spread frequency band and is composed of pseudo-random pulses, on the basis of a plurality of kinds of transmission clocks respectively having transmission speeds higher than a plurality of kinds of bit rates of bit clocks of a plurality of kinds of data items that are objects of transmission;
- a plurality of kinds of transmission multipliers multiplying each bit of the plurality of kinds of data items by said plurality of kinds of cyclic codes for transmission so as to generate a plurality of kinds of code-modulated signals;
- a reception clock extracting circuit portion receiving the plurality of kinds of code-modulated signals and extracting reception clocks, which have transmission speeds corresponding to said plurality of kinds of bit rates, respectively, from the plurality of kinds of received code-modulated signals;
- a reception code generator generating non-cyclic codes for reception, which are equivalent to said plurality of kinds of cyclic codes for transmission, on the basis of said reception clocks extracted by said reception clock extracting circuit portion; and
- a reception multiplier multiplying the plurality of kinds of received code-modulated signals by said cyclic codes for reception so as to restore said plurality of kinds of data items,
- wherein said plurality of kinds of cyclic codes for transmission are assigned to said plurality of branch points, respectively, and the contents and phases of said cyclic codes associated with said branch points are differentiated in advance from each other.

36. A data communication system according to claim 35, further comprising a reception data synchronizing circuit portion synchronizing the plurality of kinds of restored data items with said cyclic codes for reception and outputting reception data items that are synchronized with said plurality of kinds of data items on the basis of codes.

37. A data communication system, comprising at a plurality of branch points constituting a network:
- a plurality of kinds of transmission code generators generating a plurality of kinds of non-cyclic codes for transmission, each of which has a spread frequency band, on the basis of a plurality of kinds of transmission clocks respectively having transmission speeds higher than a plurality of kinds of bit rates of bit clocks of a plurality of kinds of data items that are objects of transmission;
- a plurality of kinds of transmission multipliers multiplying each bit of said plurality of kinds of data items by said plurality of kinds of non-cyclic codes for transmission so as to generate a plurality of kinds of code-modulated signals;
- a reception clock extracting circuit portion receiving the plurality of kinds of code-modulated signals and extracting reception clocks, which have transmission speeds corresponding to said plurality of kinds of bit rates, respectively, from the plurality of kinds of received code-modulated signals;
- a reception code generator generating non-cyclic codes for reception, which are equivalent to said plurality of kinds of non-cyclic codes for transmission, on the basis of said reception clocks extracted by said reception clock extracting circuit portion; and
- a reception multiplier multiplying the plurality of kinds of received code-modulated signals by said non-cyclic codes for reception so as to restore said plurality of kinds of data items;
- wherein said plurality of kinds of non-cyclic codes for transmission are assigned to said plurality of branch points, respectively, and the contents and phases of said non-cyclic codes associated with said branch points are differentiated in advance from each other.

38. A data communication system according to claim 37, further comprising a reception data synchronizing circuit portion synchronizing the plurality of kinds of restored data items with said non-cyclic codes for reception and outputting reception data items that are synchronized with said plurality of kinds of data items on the basis of codes.

39. A data communication system, comprising at a plurality of branch points constituting a network:
- a plurality of kinds of transmission pseudo-random pulse generators generating a plurality of kinds of cyclic codes for transmission, each of which has a spread frequency band and is composed of pseudo-random pulses, on the basis of a plurality of kinds of transmission clocks respectively having transmission speeds that are integral multiples of a plurality of kinds of bit rates of bit clocks of a plurality of kinds of data items that are objects of transmission;
- a plurality of kinds of transmission multipliers multiplying each bit of the plurality of kinds of data items by said plurality of kinds of cyclic codes for transmission so as to generate a plurality of kinds of code-modulated signals;
- a reception clock extracting circuit portion receiving said plurality of kinds of code-modulated signals and extracting reception clocks, which have transmission speeds corresponding to said plurality of kinds of bit rates, respectively, from the plurality of kinds of received code-modulated signals;
- a reception pseudo-random pulse generator generating cyclic codes for reception, which are equivalent to said plurality of kinds of cyclic codes for transmission and are each composed of pseudo-random pulses, on the basis of said reception clocks extracted by said reception clock extracting circuit portion; and
- a reception multiplier multiplying the plurality of kinds of received code-modulated signals by the cyclic codes for reception so as to restore said plurality of kinds of data items;
- wherein common cyclic codes that enable to pass through all or many of said plurality of branch points, are assigned.

40. A data communication system according to claim 39, further comprising a reception data synchronizing circuit portion synchronizing the plurality of kinds of restored data items with said cyclic codes for reception and outputting reception data items that are synchronized with said plurality of kinds of data items on the basis of codes.

41. A data communication system, comprising at a plurality of branch points constituting a network:
- a plurality of kinds of transmission pseudo-random pulse generators generating a plurality of kinds of cyclic codes for transmission, each of which has a spread frequency band and is composed of pseudo-random pulses, on the basis of a plurality of kinds of transmission clocks respectively having transmission speeds higher than a plurality of kinds of bit rates of bit clocks of a plurality of kinds of data items that are objects of transmission;
- a plurality of kinds of transmission multipliers multiplying each bit of the plurality of kinds of data items by said plurality of kinds of cyclic codes for transmission so as to generate a plurality of kinds of code-modulated signals;
- a reception clock extracting circuit portion receiving the plurality of kinds of code-modulated signals and extracting reception clocks, which have transmission speeds corresponding to said plurality of kinds of bit rates, respectively, from the plurality of kinds of received code-modulated signals;
- a reception pseudo-random pulse generator generating cyclic codes for reception, which are equivalent to said plurality of kinds of cyclic codes for transmission and are each composed of pseudo-random pulses, on the basis of said reception clocks extracted by said reception clock extracting circuit portion; and
- a reception multiplier multiplying the plurality of kinds of received code-modulated signals by said cyclic codes for reception so as to restore the plurality of kinds of data items;
- wherein common cyclic codes that enable to pass through all or many of said plurality of branch points, are assigned.

42. A data communication system according to claim 41, further comprising a reception data synchronizing circuit portion synchronizing the plurality of kinds of restored data items with said cyclic codes for reception and outputting reception data items that are synchronized with said plurality of kinds of data items on the basis of codes.

43. A data communication system, comprising at a plurality of branch points constituting a network:
- a plurality of kinds of transmission code generators generating a plurality of kinds of non-cyclic codes for transmission, each of which has a spread frequency band, on the basis of a plurality of kinds of transmission clocks respectively having transmission speeds higher than a plurality of kinds of bit rates of bit clocks of a plurality of kinds of data items that are objects of transmission;
- a plurality of kinds of transmission multipliers multiplying each bit of said plurality of kinds of data items by said plurality of kinds of non-cyclic codes for transmission so as to generate a plurality of kinds of code-modulated signals;
- a reception clock extracting circuit portion receiving the plurality of kinds of code-modulated signals and extracting reception clocks, which have transmission speeds corresponding to said plurality of kinds of bit rates, respectively, from the plurality of kinds of received code-modulated signals;
- a reception code generator generating non-cyclic codes for reception, which are equivalent to said plurality of kinds of non-cyclic codes for transmission, on the basis of said reception clocks extracted by said reception clock extracting circuit portion; and
- a reception multiplier multiplying the plurality of kinds of received code-modulated signals by said non-cyclic codes for reception so as to restore said plurality of kinds of data items;
- wherein common cyclic codes that enable to pass through all or many of the plurality of branch points, are assigned.

44. A data communication system according to claim 43, further comprising a reception data synchronizing circuit portion synchronizing the plurality of kinds of restored data items with said non-cyclic codes for reception and outputting reception data items that are synchronized with said plurality of kinds of data items on the basis of codes.

45. A data communication system having a plurality of data communication units, connected to a plurality of branch points constituting a network, mutually transmitting and receiving a plurality of kinds of data items, and a central control unit controlling said plurality of data communication units,
- wherein said plurality of data communication units each comprise:
  - a plurality of kinds of transmission pseudo-random pulse generators generating a plurality of kinds of cyclic codes for transmission, each of which has a spread frequency band and is composed of pseudo-random pulses, on the basis of a plurality of kinds of transmission clocks respectively having transmission speeds that are integral multiples of a plurality of kinds of bit rates of bit clocks of a plurality of kinds of data items that are objects of transmission;

a plurality of kinds of transmission multipliers multiplying each bit of said plurality of kinds of data items by said plurality of kinds of cyclic codes for transmission so as to generate a plurality of kinds of code-modulated signals;

a reception clock extracting circuit portion receiving the plurality of kinds of code-modulated signals and extracting reception clocks, which have transmission speeds corresponding to said plurality of kinds of bit rates, respectively, from the plurality of kinds of received code-modulated signals;

a reception pseudo-random pulse generator generating cyclic codes for reception, which are equivalent to said plurality of kinds of cyclic codes for transmission and are each composed of pseudo-random pulses, on the basis of said reception clocks extracted by said reception clock extracting circuit portion; and a reception multiplier multiplying the plurality of kinds of received code-modulated signals by said cyclic codes for reception so as to restore said plurality of kinds of data items;

wherein said plurality of kinds of cyclic codes for transmission are assigned to said plurality of branch points, respectively, and the contents and phases of said cyclic codes associated with said branch points are differentiated in advance from each other.

46. A data communication system according to claim 45, further comprising reception data synchronizing circuit portions each synchronizing the plurality of kinds of restored data items with said cyclic codes for reception and outputting reception data items that are synchronized with said plurality of kinds of data items on the basis of codes.

47. A data communication system according to claim 45, wherein said plurality of branch points are each provided with several candidates for said cyclic codes, and said data communication units each select given cyclic codes.

48. A data communication system according to claim 45, wherein a part or all of said plurality of kinds of cyclic codes for transmission are sent from said central control unit.

49. A data communication system according to claim 45, wherein transmission lines linking said plurality of data communication units and said central control unit are formed with double lines.

50. A data communication system according to claim 45, wherein all or some of said transmission lines that are double lines are designed so that said plurality of kinds of data items can be transmitted bidirectionally.

51. A data communication system according to claim 45, wherein when said plurality of kinds of data items are communicated in a form in which data is transmitted at low speed, cyclic codes each having a long bit string are employed; and when the plurality of kinds of data items are communicated in a form in which data is transmitted at high speed, cyclic codes each having a short bit string are employed.

52. A data communication system according to claim 50, wherein the minimum value of a Hamming distance between a cyclic code having a short bit string and a code which is a part of a cyclic code having a long bit string, of which a pattern of bits is inconsistent with that of the cyclic code having the short bit string, and of which the length is equal to that of the cyclic code having the short bit string, can be made large.

53. A data communication system according to claim 45, wherein when cyclic codes assigned to the same hierarchical level of said network are arbitrated, the cyclic codes currently used by a data communication unit, or the identification numbers of the cyclic codes, are reported to all the other data communication units within said network.

54. A data communication system according to claim 45, wherein when cyclic codes assigned to the same hierarchical level of said network are arbitrated, the cyclic codes currently used by a data communication unit, or the identification numbers of the cyclic codes, are reported to all the other data communication units, and cyclic codes scheduled to be used later, or the identification numbers of the cyclic codes, are successively reported to all the other data communication units; and when all the other data communication units acknowledge the cyclic codes, transmission of said plurality of kinds of data items is started.

55. A data communication system according to claim 53, wherein when cyclic codes which are to be used by a data communication unit are determined, any other data communication unit using cyclic codes assigned to another hierarchical level is permitted to give an instruction or to select cyclic codes.

56. A data communication system according to claim 45, wherein said plurality of kinds of transmission clocks are synchronized with each other in order to multiplex said plurality of kinds of code-modulated signals.

57. A data communication system according to claim 45, wherein when the lengths of all the cyclic codes are the same or the lengths of the cyclic codes which are to be used are submultiples of a given value, a plurality of the bit clocks whose pulse rates determine said plurality of kinds of bit rates of data items are synchronized with each other, or are shifted from each other in units of cycles of said transmission clocks.

58. A data communication system according to claim 45, wherein neither a plurality of the bit clocks whose pulse rates determine said plurality of kinds of bit rates of data items nor said plurality of kinds of transmission clocks are synchronized with each other, and said plurality of kinds of code-modulated signals are multiplexed.

59. A data communication system having a plurality of data communication units, connected to a plurality of branch points constituting a network, mutually transmitting and receiving a plurality of kinds of data items, and a central control unit controlling said plurality of data communication units, wherein said plurality of data communication units each comprise:

a plurality of kinds of transmission pseudo-random pulse generators generating a plurality of kinds of cyclic codes for transmission, each of which has a spread frequency band and is composed of pseudo-random pulses, on the basis of a plurality of kinds of transmission clocks respectively having transmission speeds higher than a plurality of kinds of bit rates of bit clocks of a plurality of kinds of data items that are objects of transmission;

a plurality of kinds of transmission multipliers multiplying each bit of said plurality of kinds of data items by said plurality of kinds of cyclic codes for transmission so as to generate a plurality of kinds of code-modulated signals;

a reception clock extracting circuit portion receiving the plurality of kinds of code-modulated signals and extracting reception clocks, which have transmission speeds corresponding to said plurality of kinds of bit rates, respectively, from the plurality of kinds of received code-modulated signals;

a reception pseudo-random pulse generator generating cyclic codes for reception, which are equivalent to said plurality of kinds of cyclic codes for transmission and are each composed of pseudo-random pulses, on the basis of said reception clocks extracted by said reception clock extracting circuit portion; and a reception multiplier multiplying the plurality of kinds of received code-modulated signals by said cyclic codes for reception so as to restore said plurality of kinds of data items;

wherein said plurality of kinds of cyclic codes for transmission are assigned to said plurality of branch points, respectively, and the contents and phases of said cyclic codes associated with said branch points are differentiated in advance from each other; and an intended address is sent from said central control unit to said plurality of branch points, and a data communication unit, connected to a branch point to which one of said cyclic codes indicating an address agreeing with the intended address is assigned, transmits and receives said data items.

60. A data communication system according to claim 59, further comprising reception data synchronizing circuit portions each synchronizing the plurality of kinds of restored data items with said cyclic codes for reception and outputting reception data items that are synchronized with said plurality of kinds of data items on the basis of codes.

61. A data communication system having a plurality of data communication units, connected to a plurality of branch points constituting a network, mutually transmitting and receiving a plurality of kinds of data items, and a central control unit controlling said plurality of data communication units, wherein said plurality of data communication units each comprise:

a plurality of kinds of transmission code generators generating a plurality of kinds of non-cyclic codes for transmission, each of which has a spread frequency band, on the basis of a plurality of kinds of transmission clocks respectively having transmission speeds higher than a plurality of kinds of bit rates of bit clocks of a plurality of kinds of data items that are objects of transmission;

a plurality of kinds of transmission multipliers multiplying each bit of said plurality of kinds of data items by said plurality of kinds of non-cyclic codes for transmission so as to generate a plurality of kinds of code-modulated signals;

a reception clock extracting circuit portion receiving said plurality of kinds of code-modulated signals and extracting reception clocks, which have transmission speeds corresponding to said plurality of kinds of bit rates, respectively, from the plurality of kinds of received code-modulated signals;

a reception code generator generating non-cyclic codes for reception, which are equivalent to said plurality of kinds of non-cyclic codes for transmission, on the basis of said reception clocks extracted by said reception clock extracting circuit portion; and a reception multiplier multiplying the plurality of kinds of received code-modulated signals by said non-cyclic codes for reception so as to restore said plurality of kinds of data items;

wherein the plurality of kinds of non-cyclic codes for transmission are assigned to said plurality of branch points, respectively, and the contents and phases of said non-cyclic codes associated with said branch points are differentiated in advance from each other; and an intended address is sent from said central control unit to said plurality of branch points, and a data communication unit connected to a branch point to which one of said cyclic codes indicating an address agreeing with the intended address are assigned, transmits and receives said data items.

62. A data communication system according to claim 61, further comprising reception data synchronizing circuit portions each synchronizing the plurality of kinds of restored data items with said non-cyclic codes for reception and outputting reception data items that are synchronized with said plurality of kinds of data items on the basis of codes.

63. A data communication system having a plurality of data communication units, connected to a plurality of branch points constituting a network, mutually transmitting and receiving a plurality of kinds of data items, and a central control unit controlling said plurality of data communication units, wherein said plurality of data communication units each comprise:

a plurality of kinds of transmission pseudo-random pulse generators generating a plurality of kinds of cyclic codes for transmission, each of which has a spread frequency band and is composed of pseudo-random pulses, on the basis of a plurality of kinds of transmission clocks respectively having transmission speeds that are integral multiples of a plurality of kinds of bit rates of bit clocks of a plurality of kinds of data items that are objects of transmission;

a plurality of kinds of transmission multipliers multiplying each bit of said plurality of kinds of data items by said plurality of kinds of cyclic codes for transmission so as to generate a plurality of kinds of code-modulated signals;

a reception clock extracting circuit portion receiving the plurality of kinds of code-modulated signals and extracting reception clocks, which have transmission speeds corresponding to said plurality of kinds of bit rates, respectively, from the plurality of kinds of received code-modulated signals;

a reception pseudo-random pulse generator generating cyclic codes for reception, which are equivalent to said plurality of kinds of cyclic codes for transmission and are each composed of pseudo-random pulses, on the basis of said reception clocks extracted by said reception clock extracting circuit portion; and a reception multiplier multiplying the plurality of kinds of received code-modulated signals by said cyclic codes for reception so as to restore said plurality of kinds of data items;

wherein common cyclic codes that enable to pass through all or many of said plurality of branch points, are assigned; and an intended address is sent from said central control unit to said plurality of branch points, and a data communication unit connected to a branch point to which one of said cyclic codes indicating an address agreeing with the intended address are assigned, transmits and receives the data items.

64. A data communication system according to claim 63, further comprising reception data synchronizing circuit portions each synchronizing the plurality of kinds of restored data items with the cyclic codes for reception and outputting reception data items that are synchronized with said plurality of kinds of data items on the basis of codes.

65. A data communication system according to claim 63, wherein said plurality of branch points are each provided with several candidates for the common cyclic codes, and said data communication units each select given cyclic codes.

66. A data communication system according to claim 63, wherein a part or all of the plurality of kinds of cyclic codes for transmission are sent from said central control unit.

67. A data communication system according to claim 63, wherein transmission lines linking said plurality of data communication units and said central control unit are formed with double lines.

68. A data communication system according to claim 67, wherein all or some of said transmission lines that Ail are double lines are designed so that the plurality of kinds of data items can be transmitted bidirectionally.

69. A data communication system according to claim 63, wherein when said plurality of kinds of data items are communicated in a form in which data is transmitted at low speed, cyclic codes each having a long bit string are employed; and when the plurality of kinds of data items are communicated in a form in which data is transmitted at high speed, cyclic codes each having a short bit string are employed.

70. A data communication system according to claim 68, wherein the minimum value of a Hamming distance between a cyclic code having a short bit string and a code which is a part of a cyclic code having a long bit string, of which a pattern of bits is inconsistent with that of the cyclic code having the short bit string, and of which the length is equal to that of the cyclic code having the short bit string, can be made large.

71. A data communication system according to claim 63, wherein when cyclic codes assigned to the same hierarchical level of said network are arbitrated, the cyclic codes currently used by a data communication unit, or the identification numbers of the cyclic codes, are reported to all the other data communication units within said network.

72. A data communication system according to claim 63, wherein when cyclic codes assigned to the same hierarchical level of said network are arbitrated, the cyclic codes currently used by a data communication unit, or the identification numbers of the cyclic codes, are reported to all the other data communication units within said network, and cyclic codes scheduled to be used later and the identification numbers of the cyclic codes, are successively reported to all the other data communication units; and when all the other data communication units acknowledge the cyclic codes, transmission of said plurality of kinds of data items is started.

73. A data communication system according to claim 71, wherein when cyclic codes which are to be used by a data communication unit are determined, any other data communication unit using cyclic codes assigned to another hierarchical level is permitted to give an instruction or to select cyclic codes.

74. A data communication system according to claim 63, wherein said plurality of kinds of transmission clocks are synchronized with each other in order to multiplex said plurality of kinds of code-modulated signals.

75. A data communication system according to claim 63, wherein when the lengths of all the cyclic codes are the same or the lengths of the cyclic codes which are to be used are submultiples of a given value, a plurality of the bit clocks whose pulse rates determine said plurality of kinds of bit rates of data items are synchronized with each other, or are shifted from each other in units of cycles of said transmission clocks.

76. A data communication system according to claim 63, wherein neither a plurality of the bit clocks whose pulse rates determine said plurality of kinds of bit rates of data items nor the plurality of kinds of transmission clocks are synchronized with each other, but said plurality of kinds of code-modulated signals are multiplexed.

77. A data communication system having a plurality of data communication units, connected to a plurality of branch points constituting a network, mutually transmitting and receiving a plurality of kinds of data items, and a central control unit for controlling said plurality of data communication units, wherein said plurality of data communication units each comprise:

a plurality of kinds of transmission pseudo-random pulse generators generating a plurality of kinds of cyclic codes for transmission, each of which has a spread frequency band and is composed of pseudo-random pulses, on the basis of a plurality of kinds of transmission clocks respectively having transmission speeds higher than a plurality of kinds of bit rates of bit clocks of a plurality of kinds of data items that are objects of transmission;

a plurality of kinds of transmission multipliers multiplying each bit of said plurality of kinds of data items by said plurality of kinds of cyclic codes for transmission so as to generate a plurality of kinds of code-modulated signals;

a reception clock extracting circuit portion receiving the plurality of kinds of code-modulated signals and extracting reception clocks, which have transmission speeds corresponding to said plurality of kinds of bit rates, respectively, from the plurality of kinds of received code-modulated signals;

a reception pseudo-random pulse generator generating cyclic codes for reception, which are equivalent to said plurality of kinds of cyclic codes for transmission and are each composed of pseudo-random pulses, on the basis of said reception clocks extracted by said reception clock extracting circuit portion; and a reception multiplier multiplying the plurality of kinds of received code-modulated signals by said cyclic codes for reception so as to restore said plurality of kinds of data items;

wherein common cyclic codes that enable to pass through all or many of said plurality of branch points, are assigned; and an intended address is sent from said central control unit to said plurality of branch points, and a data communication unit connected to a branch point to which one of the common cyclic codes indicating an address agreeing with the intended address is assigned, transmits and receives said data items.

78. A data communication system according to claim 77, further comprising reception data synchronizing circuit portions each synchronizing the plurality of kinds of restored data items with said cyclic codes for reception and outputting reception data items that are synchronized with said plurality of kinds of data items on the basis of codes.

79. A data communication system having a plurality of data communication units, connected to a plurality of branch points constituting a network, mutually transmitting and receiving a plurality of kinds of data items, and a central control unit controlling said plurality of data communication units, wherein said plurality of data communication units each comprise:

a plurality of kinds of transmission code generators generating a plurality of kinds of non-cyclic codes for transmission, each of which has a spread frequency band, on the basis of a plurality of kinds of transmission clocks respectively having transmission speeds higher than a plurality of kinds of bit rates of bit clocks of a plurality of kinds of data items that are objects of transmission;

a plurality of kinds of transmission multipliers multiplying each bit of the plurality of kinds of data items by said plurality of kinds of non-cyclic codes for transmission so as to generate a plurality of kinds of code-modulated signals;

a reception clock extracting circuit portion receiving said plurality of kinds of code-modulated signals and extracting reception clocks, which have transmission speeds corresponding to said plurality of kinds of bit rates, respectively, from the plurality of kinds of received code-modulated signals;

a reception code generator generating non-cyclic codes for reception, which are equivalent to said plurality of kinds of non-cyclic codes for transmission, on the basis of said reception clocks extracted by said reception clock extracting circuit portion; and a reception multiplier multiplying the plurality of kinds of received code-modulated signals by said non-cyclic codes for reception so as to restore said plurality of kinds of data items;

wherein common cyclic codes that enable to pass through all or many of said plurality of branch points, are assigned; and an intended address is sent from said central control unit to said plurality of branch points, and a data communication unit connected to a branch point to which one of said noncyclic codes indicating an address agreeing with the intended address are assigned, transmits and receives the data items.

80. A data communication system according to claim 79, further comprising reception data synchronizing circuit portions each synchronizing the plurality of kinds of restored data items with said non-cyclic codes for reception and outputting reception data items that are synchronized with said plurality of kinds of data items on the basis of codes.

\* \* \* \* \*

UNITED STATES PATENT AND TRADEMARK OFFICE
CERTIFICATE OF CORRECTION

| | |
|---|---|
| PATENT NO. | : 6,259,723 B1 |
| DATED | : July 10, 2001 |
| INVENTOR(S) | : Takumi Miyashita |

Page 1 of 1

It is certified that error appears in the above-identified patent and that said Letters Patent is hereby corrected as shown below:

<u>Column 51,</u>
Line 19, delete "Ail"

Signed and Sealed this

Nineteenth Day of March, 2002

Attest:

JAMES E. ROGAN
*Director of the United States Patent and Trademark Office*

*Attesting Officer*